(12) United States Patent
Arikuma et al.

(10) Patent No.: US 8,359,293 B2
(45) Date of Patent: Jan. 22, 2013

(54) PROCESSING PROCEDURE MANAGEMENT DEVICE, PROCESSING PROCEDURE MANAGEMENT METHOD, PROCESSING PROCEDURE MANAGEMENT SYSTEM, AND PROCESSING PROCEDURE MANAGEMENT PROGRAM

(75) Inventors: Takeshi Arikuma, Minato-Ku (JP); Nobuhisa Shiraishi, Minato-Ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/379,953

(22) PCT Filed: Mar. 7, 2011

(86) PCT No.: PCT/JP2011/055857
§ 371 (c)(1),
(2), (4) Date: Dec. 21, 2011

(87) PCT Pub. No.: WO2011/132475
PCT Pub. Date: Oct. 27, 2011

(65) Prior Publication Data
US 2012/0101986 A1    Apr. 26, 2012

(30) Foreign Application Priority Data

Apr. 19, 2010 (JP) .................................. 2010-095832

(51) Int. Cl.
*G06F 7/00* (2006.01)
*G06F 17/00* (2006.01)
*G05B 13/02* (2006.01)

(52) U.S. Cl. .......... 707/688; 707/687; 707/689; 700/31; 700/44; 700/51

(58) Field of Classification Search .................. None
See application file for complete search history.

(56) References Cited

U.S. PATENT DOCUMENTS 4,358,822 A * 11/1982 Sanchez ........................... 700/31
5,367,703 A * 11/1994 Levitan ........................... 712/23
(Continued)

FOREIGN PATENT DOCUMENTS

| JP | 09-091191 A | 4/1997 |
| JP | 2001-229016 A | 8/2001 |
| JP | 2002-082926 A | 3/2002 |

(Continued)

OTHER PUBLICATIONS

Nobuhisa Shiraishi, An In-house Document Retrieval System (1): Search Platform "CRISP" The 70th (H.20) National Convention of ISPJ (1). Architecture Software Science and Engineering. Database and Media, Mar. 13, 2008, pp. 1-445 to 1-446.

*Primary Examiner* — Fred I Ehichioya
*Assistant Examiner* — Garrett Smith
(74) *Attorney, Agent, or Firm* — Sughrue Mion, PLLC

(57) ABSTRACT

The present invention provides a processing procedure management device which can determine a process procedure by adapting to a performance change of a function engine used for information processing at a high speed.
The present invention includes a procedure database 31 which stores a processing procedure and its performance information, a performance history database 32 which stores a performance observed when information processing is carried out according to a processing procedure and a performance observed for each function engine which carries out a processing module that constitutes a processing procedure, a performance observation unit 33 which acquires the observed performance hereof, a future performance calculation unit 34 that calculates a performance at some point in the future for each function engine, a procedure generation unit 35 which reconstructs a processing module based on a performance in the future and generates a new processing procedure, a procedure updating unit 36 which adds a generated processing procedure and its performance information to the procedure database 31, and the procedure solving unit 37 that determines a processing procedure for carrying out designated information processing from the procedure database 31.

10 Claims, 19 Drawing Sheets

U.S. PATENT DOCUMENTS

| | | | | |
|---|---|---|---|---|
| 5,704,011 A | * | 12/1997 | Hansen et al. | 706/25 |
| 6,308,043 B1 | * | 10/2001 | Solheim et al. | 455/63.1 |
| 6,662,058 B1 | * | 12/2003 | Sanchez | 700/44 |
| 8,141,096 B1 | * | 3/2012 | Tormasov et al. | 718/104 |

FOREIGN PATENT DOCUMENTS

| | | |
|---|---|---|
| JP | 2005-258902 A | 9/2005 |
| JP | 4804836 B2 | 11/2011 |

* cited by examiner

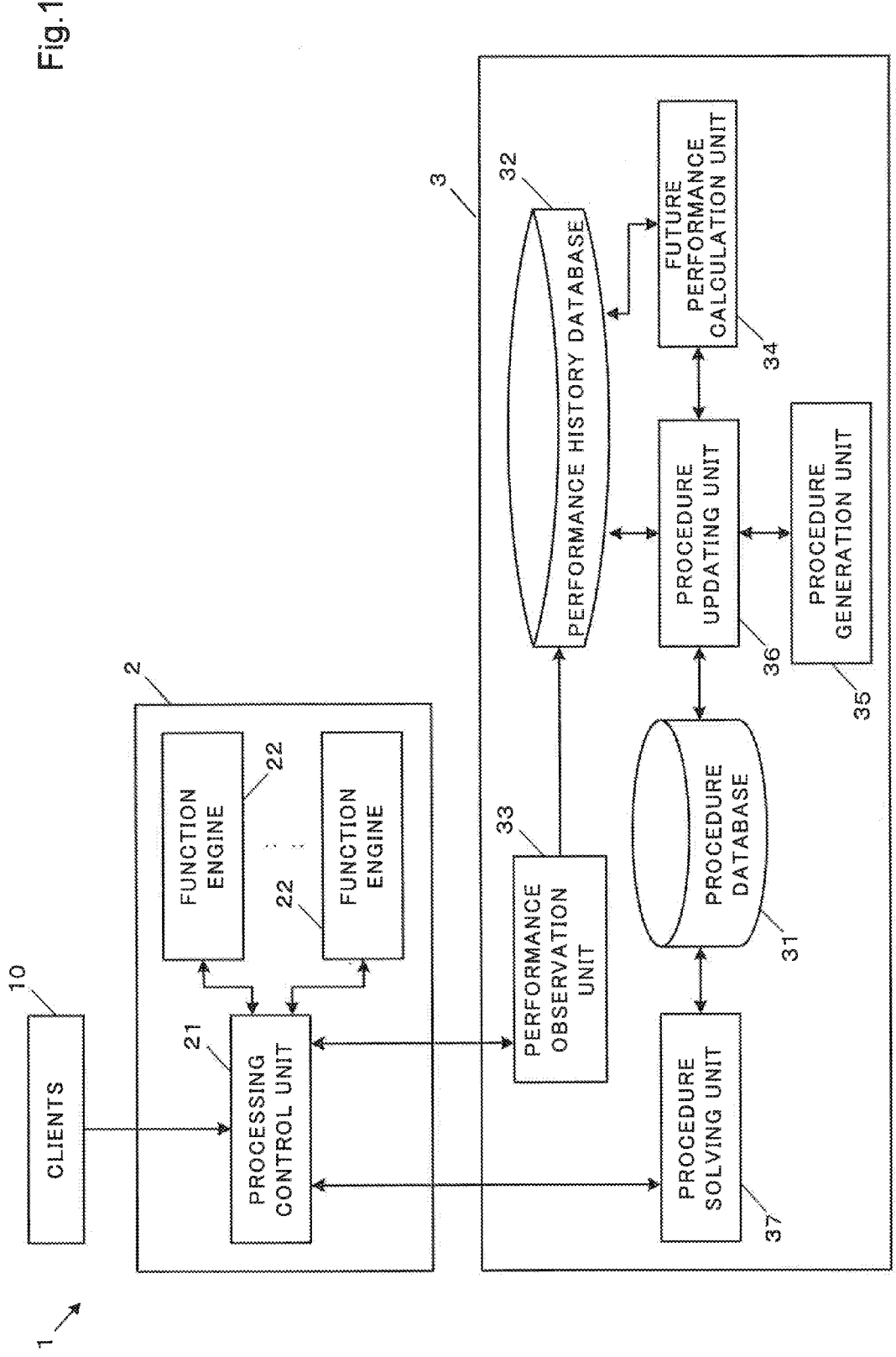

Fig.2

PROCEDURE TABLE TA

| PROCESSING PROCEDURE ID | PROCESSING PROCEDURE EXPRESSION |
|---|---|
| 1 | SYNONYM DEVELOPMENT A (SYNONYM, RELATED WORD) * [INTRA DOCUMENT SEARCH () \| WEB DOCUMENT SEARCH ()] * RESULT INTEGRATION () |
| 2 | SYNONYM DEVELOPMENT A (SYNONYM ONLY) * INTRA DOCUMENT SEARCH () |
| 3 | PERSON IDENTIFICATION() * [[RFID IDENTIFICATION() * RFID POSITION DETECTION()] \| IMAGE POSITION DETECTION ()] * RESULT INTEGRATION |
| 4 | PERSON IDENTIFICATION () * IMAGE POSITION DETECTION () |
| ... | ... |

Fig.3

PROCEDURE FEATURE TABLE TB

| PROCE-SSING PROCEDURE ID | FUNCTION TYPE (INPUT DATA TYPE, FUNCTION, OUTPUT DATA TYPE) | PERFORMANCE VECTOR (AVERAGE PRECISION, AVERAGE COVERAGE FACTOR, AVERAGE RELEVANCE RATIO, AVERAGE PROCESSING TIME) |
|---|---|---|
| 1 | (Keyword, Search, [WebDocument, IntraDocument]) | (N/A, 0.9, 0.5, 113) |
| 2 | (Keyword, Search, [WebDocument, IntraDocument]) | (N/A, 0.7, 0.8, 57) |
| 3 | (PersonID, Search, [Position, Personnel]) | (0.8, 0.8, N/A, 325) |
| 4 | (PersonID, Search, [Position, Personnel]) | (0.7, 0.6, N/A, 219) |
| 3 | (PersonID, Search, Personnel) | (0.9, 0.9, N/A, 325) |
| 4 | (PersonID, Search, Personnel) | (0.9, 0.9, N/A, 219) |
| ⋮ | ⋮ | ⋮ |

Fig. 4

PERFORMANCE HISTORY TABLE TC

| TIME | FUNCTION TYPE (INPUT DATA TYPE, FUNCTION, OUTPUT DATA TYPE) | PROCE-SSING PROCEDURE ID | OBSERVATION PERFORMANCE VECTOR (PRECISION, COVERAGE FACTOR, RELEVANCE RATIO, PROCESSING |
|---|---|---|---|
| 2010/2/10T10:24:31.124 | (Keyword, Search, [WebDocument, IntraDocument]) | 2 | (N/A, 0.65, 0.72, 72) |
| 2010/2/10T10:24:31.431 | (Keyword, Search, [WebDocument, IntraDocument]) | 2 | (N/A, 0.71, 0.85, 36) |
| 2010/2/10T10:24:31.647 | (PersonID, Search, [Position, Personnel]) | 3 | (0.81, 0.89, N/A, 323) |
| 2010/2/10T10:24:31.987 | (PersonID, Search, [Position, Personnel]) | 3 | (0.75, 0.82, N/A, 219) |
| 2010/2/10T10:24:32.673 | (Keyword, Search, [WebDocument, IntraDocument]) | 2 | (N/A, 0.68, 0.79, 53) |
| 2010/2/10T10:24:34.242 | (Keyword, Search, [WebDocument, IntraDocument]) | 1 | (N/A, 0.95, 0.62, 131) |
| ⋮ | ⋮ | | ⋮ |

Fig.5

FUNCTION ENGINE PERFORMANCE HISTORY TABLE TF

| TIME | FUNCTION TYPE (INPUT DATA TYPE, FUNCTION, OUTPUT DATA TYPE) | FUNCTION ENGINE ID | FUNCTION ENGINE OBSERVATION PERFORMANCE VECTOR (PRECISION, COVERAGE FACTOR, RELEVANCE RATIO, PROCESSING TIME) |
|---|---|---|---|
| 2010/2/10T10:24:31.124 | (Keyword, Search, [WebDocument, IntraDocument]) | INTRA DOCUMENT SEARCH | (N/A, 0.34, 0.88, 21) |
| 2010/2/10T10:24:31.231 | (Keyword, Search, [WebDocument, IntraDocument]) | WEB DOCUMENT SEARCH | (N/A, 0.81, 0.73, 31) |
| 2010/2/10T10:24:31.237 | (PersonID, Search, [Position, Personnel]) | RFID POSITION DETECTION | (0.81, 0.35, N/A, 153) |
| 2010/2/10T10:24:31.387 | (PersonID, Search, [Position, Personnel]) | IMAGE POSITION DETECTION | (0.75, 0.82, N/A, 219) |
| 2010/2/10T10:24:32.373 | (Keyword, Search, [WebDocument, IntraDocument]) | INTRA DOCUMENT SEARCH | (N/A, 0.30, 0.78, 22) |
| 2010/2/10T10:24:34.142 | (Keyword, Search, [WebDocument, IntraDocument]) | WEB DOCUMENT SEARCH | (N/A, 0.84, 0.72, 34) |
| ⋮ | ⋮ | ⋮ | ⋮ |

Fig.6

PERFORMANCE STATISTICAL TABLE TD

| PROCE-SSING PROCE-DURE ID | FUNCTION TYPE (INPUT DATA TYPE, FUNCTION, OUTPUT DATA TYPE) | STATISTICAL PERFORMANCE VECTOR (AVERAGE PRECISION, AVERAGE COVERAGE RATIO, AVERAGE RELEVANCE RATIO, AVERAGE PROCESSING TIME) | LAST UPDATED TIME |
|---|---|---|---|
| 1 | (Keyword, Search, [WebDocument, IntraDocument]) | (N/A, 0.91, 0.48, 133) | 2010/2/10T10:20:31.124 |
| 2 | (Keyword, Search, [WebDocument, IntraDocument]) | (N/A, 0.65, 0.82, 53) | 2010/2/10T10:22:61.431 |
| 3 | (PersonID, Search, [Position, Personnel]) | (0.83, 0.75, N/A, 355) | 2010/2/10T10:21:35.247 |
| 4 | (PersonID, Search, [Position, Personnel]) | (0.72, 0.53, N/A, 229) | 2010/2/10T10:24:43.187 |
| 3 | (PersonID, Search, Personnel) | (0.92, 0.93, N/A, 305) | 2010/2/10T10:22:33.513 |
| 4 | (PersonID, Search, Personnel) | (0.91, 0.88, N/A, 219) | 2010/2/10T10:00:00.242 |
| ... | ... | ... | ... |

Fig. 12

PERFORMANCE CHANGE RULE TABLE TE

| FUNCTION ENGINE ID | FUNCTION TYPE (INPUT DATA TYPE, FUNCTION, OUTPUT DATA TYPE) | ADAPTATION CONDITION | PERFORMANCE CHANGE TENDENCY (PRECISION CHANGE TECHNOLOGY, COVERAGE FACTOR CHANGE TENDENCY, RELEVANCE RATION CHANGE TENDENCY, PROCESSING TIME CHANGE TENDENCY) |
|---|---|---|---|
| RFID POSITION DETECTION (ENVIRONMENTAL LEARNING TYPE) | (PersonID, Search, [Position, Personnel]) | PRECISION<0.9 | (1/t, 0, N/A, 0) |
| RFID POSITION DETECTION (ENVIRONMENTAL LEARNING TYPE) | (PersonID, Search, [Position, Personnel]) | PRECISION≧0.9 | (0, 0, N/A, 0) |
| RFID POSITION DETECTION (ENVIRONMENTAL LEARNING TYPE) | (PersonID, Search, [Position, Personnel]) | COVERAGE FACTOR<0.7 | (1/t, 0, N/A, 0) |
| RFID POSITION DETECTION (ENVIRONMENTAL LEARNING TYPE) | (PersonID, Search, [Position, Personnel]) | COVERAGE FACTOR≧0.7 | (0, 0, N/A, 0) |
| ︙ | ︙ | ︙ | ︙ |

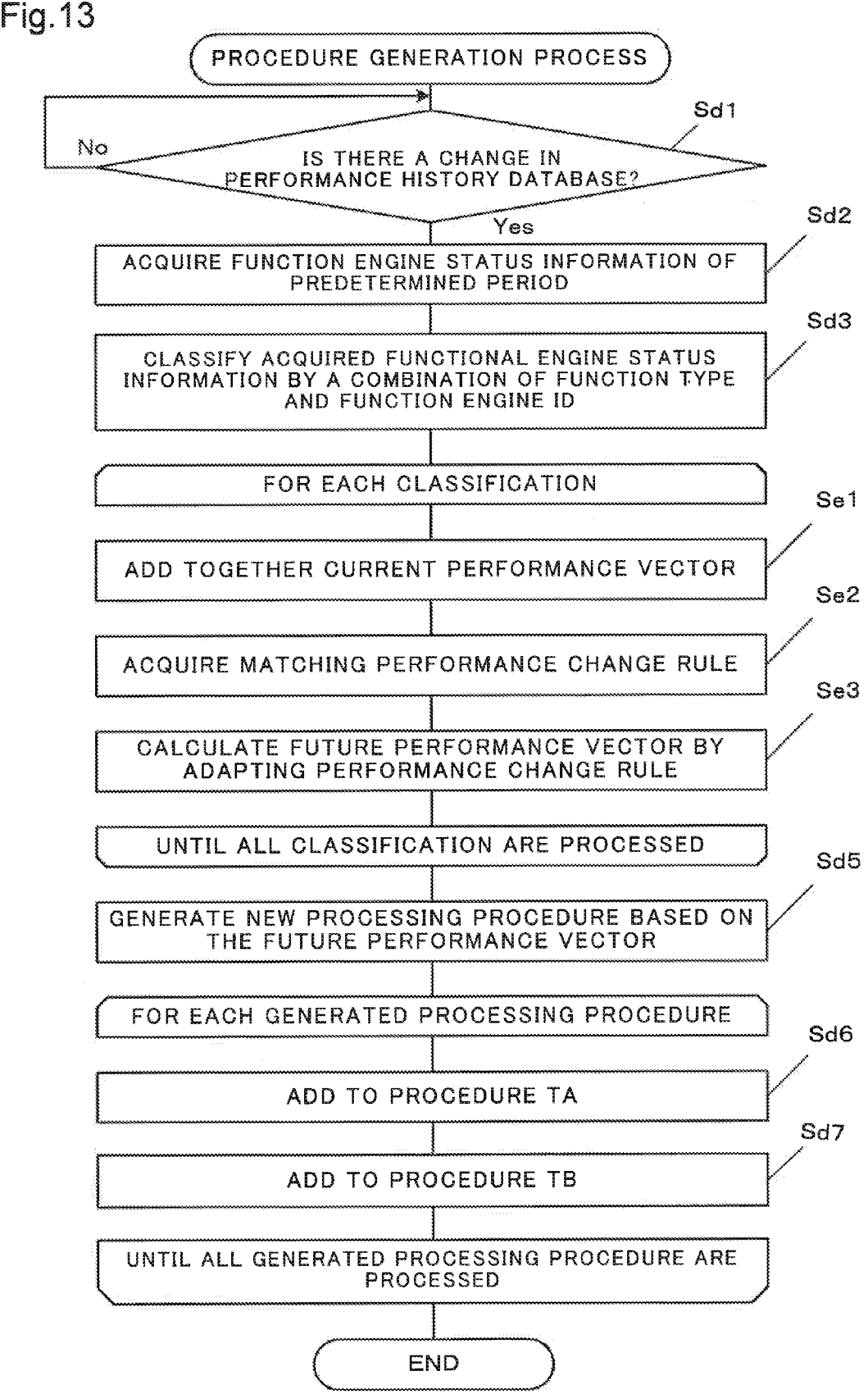

PROCESSING PROCEDURE MANAGEMENT DEVICE, PROCESSING PROCEDURE MANAGEMENT METHOD, PROCESSING PROCEDURE MANAGEMENT SYSTEM, AND PROCESSING PROCEDURE MANAGEMENT PROGRAM

TECHNICAL FIELD

The present invention relates to a processing procedure management device, a processing procedure management method, a processing procedure management system, and processing procedure management program which manages a processing procedure.

BACKGROUND ART

A processing procedure management device which manages a candidate for a plurality of processing procedures for performing information processing and determines a suitable processing procedure to designated information processing is known.

As this kind of processing procedure management device, as shown in FIG. 18, there are some which includes an algorithm registration unit 101, an optimum pattern judgment condition designation unit 102, an algorithm designation unit 103, a search pattern extraction unit 104, a search pattern execution unit 105, a data input unit 106, and an optimum pattern judgment unit 107 (for example, refer to patent document 1).

A processing procedure management device disclosed in patent document 1 determines a processing procedure as follows.

First, the algorithm registration unit 101 registers such things as various algorithms or a parameter combination rule which are used for data processing. Next, the data input unit 106 acquires data of a processing object, and the optimum pattern judgment condition designation unit 102 sets a target performance value for determining an optimum combination pattern of an algorithm or a rule used for processing data of a processing object as a judgment condition. When the condition to select algorithm used for data processing is designated by the user, the algorithm designation unit 103 acquires selection conditions of algorithm to use. Next, the search pattern extraction unit 104 selects algorithm used for data processing based on the selection condition and builds "the combination pattern" that is the pattern of how to combine the algorithm. Next, the search pattern execution unit 105 carries out "the combination pattern" to all of the "combination patterns" and generates each output data. Next, the optimum pattern determination unit 107 judges the optimum "combination pattern" based on a judgment condition and outputs information on the optimum data, optimum combination pattern and the like.

THE PRIOR TECHNICAL DOCUMENT

Patent Document

[Patent document 1] Japanese Patent Application Laid-Open No. 2007-066007

SUMMARY OF THE INVENTION

Problems to be Solved by the Invention

However, the technology disclosed in patent document 1, when a suitable processing procedure is determined, cannot adapt itself to a performance change of a function engine which carries out each algorithm respectively at a high speed.

The reason will be described. Generally, the performance of the function engine may change according to such things as the amount or the content of the information which the function engine holds. Further, the performance of the function engine of the learning type may change over time depending on the degree of the learning. Further, the performance mentioned hereof includes a performance related to the load of processing (such as the processing time and the calculation resource consumption) and the performance related to the quality of the processing result (such as the precision and likelihood).

However, for the technology disclosed in patent document 1, in order to determine the optimum processing procedure at a certain given time, it is necessary to actually carry out a plurality of "combination patterns" that become a candidate for the optimum processing procedure. Accordingly, in the processing procedure management device disclosed in patent document 1, a time lag occurs to the adaptation to a performance change only for the execution time of a plurality of the "combination pattern". Therefore, in a processing procedure management device described in patent document 1, the above-mentioned problem of which a high-speed adaptation is difficult occurs.

The present invention is made to solve the above-mentioned problem, and the object of the present invention is to provide a processing procedure management device which can determine a processing procedure by adapting to a performance change in a function engine used for information processing at a high speed.

Means for Solving the Problem

A processing procedure management device of the present invention includes: a procedure database which stores a processing procedure for carrying out information processing together with performance information representing its performance; a performance history database which stores an observation performance information representing the performance that is observed when said information processing is carried out according to said processing procedure and a function engine observation performance information representing the performance that is observed for each function engine which carries out a processing module that constitutes said processing procedure; performance observation means which acquires said observation performance information and said function engine observation performance information and stores to said performance history database; a future performance calculation means which calculates future performance information representing the performance at some point in the future for each function engine based on the said performance history database; procedure generation means which generates a new processing procedure for reconstructing said processing module based on said future performance information and carrying out said information processing; procedure updating means which updates the performance information of said procedure database based on said performance history database together with adding a processing procedure generated by said procedure generation means and its performance information to said procedure database; and procedure solving means which determines a processing procedure for carrying out the designated information processing based on said procedure database and outputs.

Further, a processing procedure management system of the present invention is a processing procedure management system including a processing execution device which carries out information processing according to a processing procedure and a processing procedure management device which manages said processing procedure; wherein said processing execution device includes a processing control means which requests a decision of a processing procedure for carrying out said information processing to said processing procedure management device together with carrying out said information processing according to a processing procedure determined by said processing procedure management device; and a function engine which carries out each processing module that constitutes said processing procedure respectively; and wherein said processing procedure management device includes; a procedure database which stores said processing procedure with performance information representing its performance; a performance history database which stores an observation performance information representing the observation when said information processing is carried out according to said processing procedure and a function engine observation performance information representing the performance that is observed for each said function engine; future performance calculation means which calculates future performance information representing the performance at some point in the future for each said function engine based on the said performance history database; procedure generation means which generates a new processing procedure for reconstructing said processing module based on said future performance information and carrying out said information processing; procedure updating means which updates the performance information of said procedure database based on said performance history database together with adding a processing procedure generated by said procedure generation means and its performance information to said procedure database; and procedure solving means which determines a processing procedure for carrying out the designated information processing based on said procedure database and outputs.

Further, a processing procedure management method of the present invention, by using a processing execution device which carries out information processing according to a processing procedure and a processing procedure management device which manages said processing procedure, said processing procedure management device; stores said processing procedure in a procedure database with performance information representing its performance; acquires observation performance information representing the performance that is observed when said information processing is carried out according to said processing procedure, and function engine observation performance information representing the performance that is observed for each function engine which carries out said processing module; stores the acquired observation performance information and the function engine observation performance information in performance history database; calculates future performance information representing the performance at some time in the future for each said function engine based on said performance history database; generates a new processing procedure for reconstructing said processing module based on said future performance information and for carrying out said information processing; updates performance information on said procedure database based on said performance history database; and adds said processing procedure that is newly generated and its performance information to said procedure database; said processing execution device requests a decision of a processing procedure for carrying out said information processing to said processing procedure management device; said processing procedure management device determines a processing procedure for carrying out the requested information processing from said procedure database; and said processing execution device executes said information processing according to a processing procedure determined by said processing procedure management device.

Further, a processing procedure management program of which a recording medium of the present invention stores makes a processing procedure management device which manages a processing procedure for carrying out information processing to execute: a processing procedure storage step for storing said processing procedure in a procedure database with performance information representing its performance; a performance observation step for acquires observation performance information representing the performance that is observed when said information processing is carried out according to said processing procedure and function engine observation performance information representing the performance that is observed for each function engine which carries out a processing module that constitutes processing procedure; a performance history storage step for storing observation performance information and function engine observation performance information acquired in said performance observation step to performance history database; a future performance calculation step for calculating the future performance information representing the performance at some point in the future for each said function engine based on said performance history database; a procedure generation step for generating a new processing procedure for reconstructing said processing module based on said future performance information and carrying out said information processing; a procedure updating step for updating performance information of said procedure database based on said performance history database together with adding a processing procedure generated in said procedure generation step and its performance information to said procedure database; and a procedure solving step for determining a processing procedure for carrying out designated information processing based on said procedure database and outputs.

Advantageous Effect of the Invention

The present invention can determine a processing procedure by adapting to a performance change in a function engine used for information processing at a high speed.

BRIEF DESCRIPTION OF THE DRAWINGS

FIG. 1 It is a functional block diagram showing a composition of a processing procedure management system as a first exemplary embodiment of the present invention.

FIG. 2 It is a figure showing an example of data stored in a procedure table according to the first exemplary embodiment of the present invention.

FIG. 3 It is a figure showing an example of data stored in a procedure feature table according to the first exemplary embodiment of the present invention.

FIG. 4 It is a figure showing an example of data stored in a performance history table according to the first exemplary embodiment of the present invention.

FIG. 5 It is a figure showing an example of data stored in a function engine performance history table according to the first exemplary embodiment of the present invention.

FIG. 6 It is a figure showing an example of data stored in a performance statistical table according to the first exemplary embodiment of the present invention.

FIG. 12 It is a figure showing an example of data stored in a performance change rule table according to the second exemplary embodiment of the present invention.

FIG. 13 It is a flowchart illustrating procedure generation operation of the processing procedure management system as the second exemplary embodiment of the present invention.

MODES FOR CARRYING OUT THE INVENTION

Hereinafter, the exemplary embodiments of the present invention will be described with reference to the drawings.

A First Exemplary Embodiment

A function block of a processing procedure management system 1 as a first exemplary embodiment of the present invention is shown in FIG. 1. In FIG. 1, the processing procedure management system 1 includes a processing execution device 2 which carries out information processing directed from the user and a client device 10 and a processing procedure management device 3 which manages a processing procedure of information processing carried out by the processing execution device 2. Further, the processing execution device 2 and the processing procedure management device 3 are connected as possible to have communication with each other.

Figure 19:
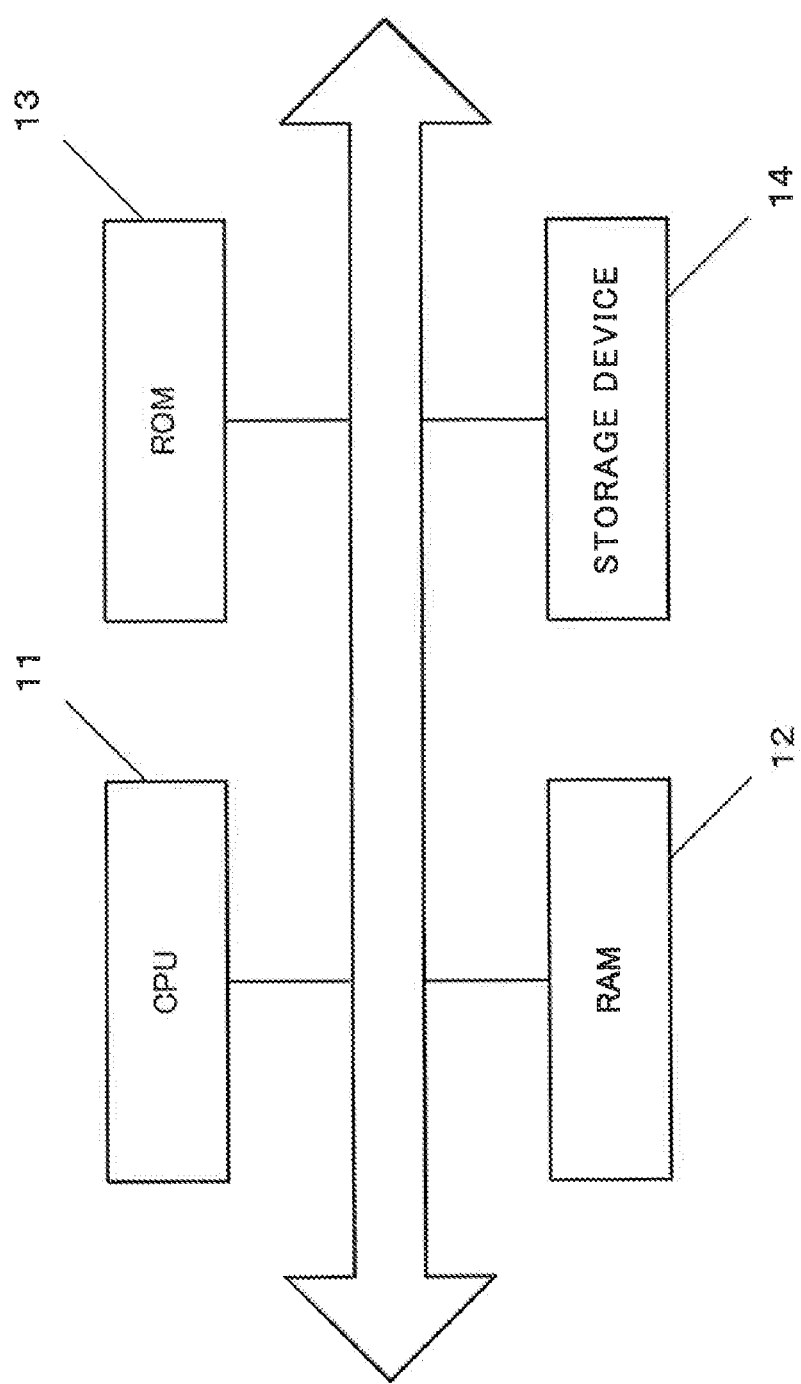
FIG. 19 It is an example of a hardware configuration diagram of a processing execution device 2 and a processing procedure management device 3.

Here, the processing execution device 2 and the processing procedure management device 3, as shown in FIG. 19, each are composed of a general-purpose computer having at least a CPU (Central Processing Unit) 11, a RAM (Random Access Memory) 12, a ROM (Read Only Memory) 13, and a storage device 14.

The configuration of the processing execution device 2 will be described first.

The processing execution device 2 is an apparatus which carries out information processing in order to provide a function to the client device 10. Here, the function to be provided to the client device 10, for example, means various functions that are realized by information processing such as service which searches for a web and a document on the intranet.

The processing execution device 2 hereof includes a processing control unit 21 and more than one function engines 22. Further, in FIG. 1, although two function engines 22 are shown, the number of the function engine provided in the processing execution device is not limited in the present invention. Further, the processing control unit 21 and the function engine 22 are constituted as a circuit which is stored in a storage device of a computer as a program module and carried out by CPU.

The processing control unit 21 acquires an offer request of the function from the client device 10. Then, the processing control unit 21 carries out information processing which realizes the requested function based on a processing procedure, and outputs a processing result to the client device 10.

At that time, the processing control unit 21 requests a decision of a processing procedure of information processing which realizes the requested function to the after-mentioned processing procedure management device 3. Then, the processing control unit 21, according to a processing procedure determined by a processing procedure management device 3, carries out information processing which realizes the requested function.

The function engines 22 carry out a processing module that constitutes information processing which realizes the function requested from a client device 10. The function engines 22 carry out the processing module under control of the processing control unit 21, and outputs to the processing control unit 21.

Next, the configuration of the processing procedure management device 3 will be described.

The processing procedure management device 3 includes a procedure database 31, a performance history database 32, a performance observation unit 33, a future performance calculation unit 34, a procedure generation unit 35, a procedure updating unit 36, and a procedure solving unit 37. Here, the procedure database 31 and the performance history database 32 may include a storage device of a computer. Moreover, the performance observation unit 33, the future performance calculation unit 34, the procedure generation unit 35, a procedure updating unit 36, and the procedure solving unit 37 are stored in a storage device of a computer as a program module and constituted as a circuit which is carried out by the CPU.

The procedure database 31 stores a candidate for the processing procedure for performing information processing which realizes the function that can be requested to the processing execution device 2 from the client device 10 together with its performance information.

An example of data stored in the procedure database 31 will be described using FIG. 2 and FIG. 3. The procedure database 31 is composed of a procedure table TA shown in FIG. 2 and a procedure feature table TB shown in FIG. 3. As shown in FIG. 2, the procedure table TA stores a tuple composed of a processing procedure expression representing a processing procedure and a processing procedure ID that identifies a processing procedure.

The processing procedure ID is for identifying a processing procedure uniquely and is a primary key of the procedure table TA. Further, the processing procedure ID is not limited to numeric characters, it may be for example information such as any character string or URI (Uniform Resource Identifier) which can uniquely distinguish a processing procedure.

The processing procedure expression is an expression in which a procedure for carrying out information processing is written. In other words, a combination of a function engine for carrying out information processing and its execution sequence is written in a processing procedure expression. In the example of FIG. 2, the processing procedure expression is described by function call and a join operator (| for parallel execution and * for serial execution) of a function engine. For example, the processing procedure expression of a processing procedure ID 1 indicates a process procedure to call a function engine as synonym development A by an argument which even develops synonym and a related word, then, to call an intra document search function engine and a web document search function engine in parallel, then, to call a result integration function engine.

Here, the processing procedure expression does not need to be such character string information. The processing procedure expression, for example, it may be information such as a graphic expression such as an Activity diagram or a flowchart of UML (Unified Modeling Language) which can uniquely specify a combination and execution sequence of a function engine necessary for information processing.

As shown in FIG. 3, the procedure feature table TB stores a tuple composed of a processing procedure ID that identifies a processing procedure, a function type that represents the function realized by the processing procedure, and a performance vector that represents the performance of the processing procedure.

The processing procedure ID and the function type are a primary key of the procedure feature table TB. The processing procedure ID is information for indicating of which feature of the processing procedure is being described by the tuple, and is a foreign key of the ID of the procedure table TA.

The function type expresses the function realized by having information processing carried out according to the processing procedure hereof. In other words, the function type represents of what purpose the processing procedure will be used and of which function provided by the processing execution device 2 it will be used for. For example, as seen in the example of FIG. 3, the function type may be expressed by a triplet of an input data type, a function, and an output data type. Further, in the example hereof, to the input data type expressing the function type, the function and the output data type, controlled words set in advance are used.

For example, in the example of line 1 of FIG. 3, when a keyword is designated as input, the function type that performs a search using the keyword and provides a document on the intranet in the company and a document on the web as a search result is being expressed.

Further, the function type does not need to be such triplet expression. The function type, for example, it may be information such as graphic expression, a function expression by a single word, and express the function as numeric vector, the function type should be information which can specify the function.

The performance vector is a vector which expresses the performance when carrying out information processing of the function type according to processing procedure identified by the processing procedure ID. Further, the performance vector composes one embodiment of performance information of the present invention. In the example of FIG. 3, the performance vector is composed of numerical numbers representing four indexes which are an average precision, an average coverage factor, an average relevance ratio, and an average processing time. The performance vector stored in the procedure feature table TB is composed of the average value of each index when a processing procedure is carried out in the past.

Further, an index of which a performance vector is composed does not need to be limited to the above-mentioned four, and it may be added according to the diversity of the function type and the change target to adapt, or it may be reduced. For example, the performance vector is not limited to the average value of each index, and it may include an index which indicates the distribution of the performance by the input data such as dispersion and coefficient of variance. The performance vector may include an index which indicates the processing load such as a CPU load and a hard disk load.

The performance history database 32 stores an observation performance vector representing a performance that is observed when information processing is carried out according to a processing procedure stored in the procedure database 31. Further, the performance history database 32 stores a function engine observation performance vector representing the performance that is observed for each function engine which carries out a processing module that constitutes a processing procedure stored in the procedure database 31. The performance history database 32 hereof includes a performance history table TC, a function engine performance history table TF, and a performance statistical table TD.

An example of data stored in the performance history table TC is shown in FIG. 4. The performance history table TC stores a tuple composed of a time, a function type, a processing procedure ID, and an observation performance vector. Hereinafter, the tuple hereof is also called as status information representing a state that is observed when information processing is actually carried out according to a processing procedure.

The time indicates the time when status information was observed. Here, an expression for the time should be able to uniquely determine one point on the time axis, other than the character string shown in FIG. 4, information such as milliseconds from a certain date may be used.

The function type is for representing on which function did the processing procedure that the status information indicates is carried out, and is a foreign key of the function type in the procedure feature table TB.

The processing procedure ID is for identifying a processing procedure which status information indicates and is a foreign key of the ID of the procedure table TA.

The observation performance vector is a vector indicating a performance observed when a processing procedure which status information indicates is carried out. Further, the observation performance vector composes one embodiment of observation performance information of the present invention. In the example of FIG. 4, the observation performance vector is composed of numerical numbers representing four indexes which are a precision, a coverage factor, a relevance ratio, and a processing time. Here, an index of which an observation performance vector is composed is not limited to the above-mentioned four, and it may be added according to the diversity of the function type and the change target to adapt, or it may be reduced.

An example of data stored in the function engine performance history table TF is shown in FIG. 5. The function engine performance history table TF stores a tuple composed of a time, a function type, a function engine ID, and a function engine observation performance vector. Hereinafter, the tuple is also called as function engine status information which represents the state observed at each function engine when information processing is actually carried out by the processing execution device 2 actually according to a processing procedure.

The time indicates the time when function engine status information was observed. Here, an expression for the time should be able to uniquely determine one point on the time axis, and other than character string expression shown in FIG. 5, information such as milliseconds from a certain date may be used.

The function engine ID is for indicating to which function engine is the function engine status information hereof related to. Here, the function engine ID should be information which can uniquely distinguish each function engine, and for example, it may be things such as any character string or a numerical value which indicates URI and an engine name. Further, as the example of FIG. 5, to the function engine ID, the same expression of the function engine in the processing procedure expression of the procedure table TA shown in FIG. 2 may be used.

The function type is for indicating by which processing procedure that realizes a function is the function engine that indicates the function engine status information is carried out by. The function type hereof is a foreign key of the function type in the procedure feature table TB.

The function engine observation performance vector is a vector indicating a performance observed when a function engine which status information indicates is carried out. Further, the function engine observation performance vector composes one embodiment of function engine observation performance information of the present invention. In the example of FIG. 5, the function engine observation performance vector hereof is composed of numerical numbers representing four indexes which are a precision, a coverage factor, a relevance ratio, and a processing time. Here, an index included in the function engine observation performance vector is not limited to the above-mentioned four, and it may be added according to the diversity of the function type and the change target to adapt, or it may be reduced.

An example of data stored in a performance statistical table TD is shown in FIG. 6. The performance statistical table TD stores a tuple composed of a processing procedure ID, a function type, a statistical performance vector, and the last update time.

The processing procedure ID and the function type are a primary key of performance statistical table TD. That is, the number of tuples of this table is the same with the number of tuples of the procedure feature table TB.

The processing procedure ID is information for indicating the statistics about which processing procedure the tuple represents and is a foreign key of the processing procedure ID for the procedure table TA.

The function type shows of which purpose is the processing procedure is used and of which function is used. The function type hereof is a foreign key of the function type of the procedure feature table TB.

The statistical performance vector is a vector which expresses statistics information on the performance observed when information processing which realizes the function of the function type using a processing procedure identified by the processing procedure ID is carried out. In an example of FIG. 6, a statistical performance vector is composed of the average value of each index representing the performance. Here, the statistical performance vector is information which becomes the performance vector value stored in the aforementioned procedure feature table TB. In other words, an index which constitutes the statistical performance vector hereof covers an index which constitutes a performance vector of the procedure feature table TB. That is, the character group which constitutes the performance vector of the procedure feature table TB should be a subset of character group which constitutes the statistical performance vector.

The last update time indicates the time when the statistical performance vector was last updated. Further, the last update time should be able to uniquely determine one point on the time axis, other than the character string shown in FIG. 6, information such as milliseconds from a certain date may be used.

The performance observation unit 33 acquires status information and function engine status information from the processing control unit 21 and registers to the performance history table TC and a function engine performance history table TF of the performance history database 32.

The future performance calculation unit 34 will calculate the future performance vector representing the performance at some time in the future of each function engine based on the function engine observation performance vector included in the function engine status information.

The procedure generation unit 35 reconstructs a processing module which will be carried out by a function engine based on the future performance vector of each function engine and generates a new processing procedure for realizing the function that can be requested from the client device 10 to the processing execution device 2.

Further, the procedure generation unit 35 will calculate the performance vector of a newly generated processing procedure based on the future performance vector of each function engine.

For example, the procedure generation unit 35 generates a new processing procedure for having the processing execution device 2 to carry out information processing which realizes the function of the function type as "(Keyword, Search, [WebDocument, IntraDocument])" based on the future performance vector. Here, to the procedure table TA, a processing procedure of the processing procedure ID 1 and 2 are registered as a processing procedure of information processing which already realizes the function of the function type. At that time, the case is assumed wherein it can be judged that the value of the performance vector of the function engine "synonym search B" will be more excellent than the future performance value of the function engine "synonym search A" which was calculated by the future performance calculation unit 34. In this case, the procedure generation unit 35 newly generates a processing procedure "synonym search B (synonym only)*intra document search ( )" of which using the synonym search B instead of the synonym search A.

The procedure updating unit 36 totals the observation performance vector of performance history table TC of the performance history database 32 and updates the statistical performance vector of performance statistical table TD of the performance history database 32. Further, at the same time, the procedure updating unit 36 updates the last update time of performance statistical table TD.

Further, the procedure updating unit 36 updates the performance vector of the procedure feature table TB based on the statistical performance vector of performance statistical table TD.

Further, the procedure updating unit 36 assigns the new processing procedure ID to a processing procedure newly generated by the procedure generation unit 35 and additionally registers to the procedure table TA of the procedure database 31. Further, the procedure updating unit 36 additionally registers the performance vector of the additionally registered processing procedure to the procedure feature table TB.

The procedure solving unit 37 acquires information representing a procedure solving request from the processing control unit 21. Then, the procedure solving unit 37 analyzes a procedure solving request and searches for a request function type that is the function requested by the client device 10 and a request performance vector which is the requested performance. The procedure solving unit 37, based on the procedure database 31, selects a processing procedure which satisfies the request function type and the request performance vector and outputs the selected processing procedure to the processing control unit 21.

Further, in the above-mentioned description, although an example of the processing control unit 21 and the function engine 22 being composed of the same computer equipment have been described, the processing control unit 21 and each function engine 22 may be composed of a different computer equipment which can communicate with each other. Furthermore, in the above-mentioned description, although an example of the procedure solving unit 37 and other component elements being composed of the same computer equipment have been described, these components may also be composed of different computer equipment which can communicate with each other.

The operation of the processing procedure management system 1 constituted as the above will be described using FIG. 7 to FIG. 10.

The processing procedure management system 1 carries out a processing procedure request solving process to solve a processing procedure request, a performance observation process to observe the performance when carrying out a processing procedure, a procedure feature updating process to update the procedure feature table TB, and a procedure generating process to generate and additionally registers a new processing procedure. Further, the processing procedure management system 1 can carry out such process independently.

Figure 7:
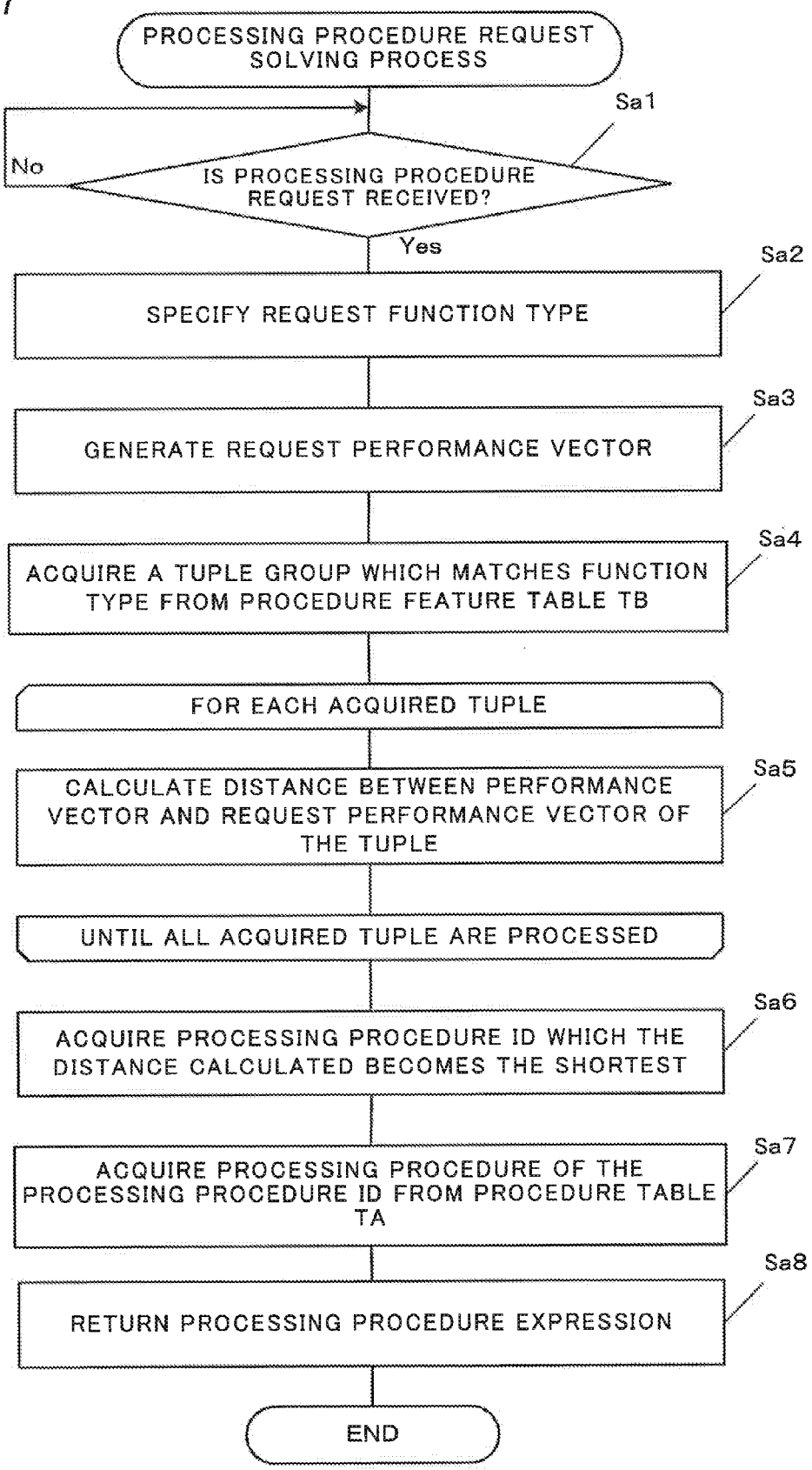
FIG. 7 It is a flowchart illustrating a processing procedure request solving operation of the processing procedure management system as the first exemplary embodiment of the present invention.

First, the processing procedure request solving process will be described using FIG. 7.

Here, at first, when a processing procedure request from the processing control unit 21 is accepted (Yes in step Sa1), the procedure solving unit 37 analyzes the processing procedure request and specifies the required function type (step Sa2).

Next, the procedure solving unit 37 analyzes the processing procedure request and generates a required performance vector (step Sa3).

Next, the procedure solving unit 37 acquires a tuple group which match with the required function type that the function type requested in step Sa2 from the procedure feature table TB of the procedure database 31 (step Sa4).

Next, the procedure solving unit 37 calculates the distance between the performance vector of each acquired tuple and the required performance vector (step Sa5). Here, the procedure solving unit 37, as the distance between the performance vector of each tuple and the required performance vector, for example, may calculate the cosine distance. The procedure solving unit 37 repeats step Sa5 on all tuples acquired in step Sa4.

Next, the procedure solving unit 37 acquires the processing procedure ID for the tuple by which the distance calculated in step Sa5 becomes the shortest (step Sa6).

Next, the procedure solving unit 37 acquires a processing procedure expression with this processing procedure ID from the processing table TA (step Sa7).

Finally, the procedure solving unit 37 returns the acquired processing procedure expression to the processing control unit 21 (step Sa8) and ends processing procedure request solving process.

Figure 8:
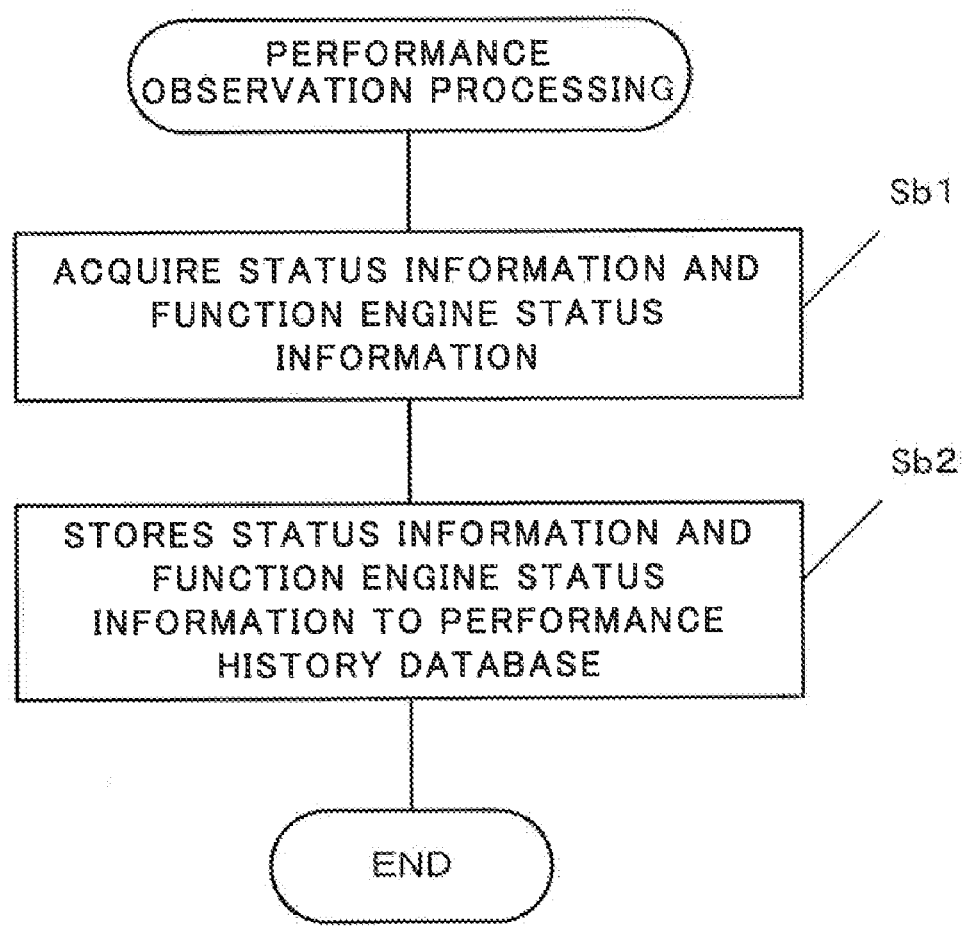
FIG. 8 It is a flowchart illustrating performance observation operation of the processing procedure management system as the first exemplary embodiment of the present invention.

Next, a performance observation processing will be described using FIG. 8.

Here, at first, the performance observation unit 33 acquires status information which was observed when information processing according to a processing procedure was carried out by the processing execution device 2 and function engine status information observed for each function engine 22 at that time from the processing control unit 21 (step Sb1).

Next, the performance observation unit 33 stores the acquired status information and the function engine status information to the performance history table TC and the function engine performance history table TF of performance history database 32 (step Sb2).

Here, the performance observation unit 33, by requesting status information and the function engine status information to the processing control unit 21, may acquire these information from the processing control unit 21. Further, the processing control unit 21 may notify these information to the performance observation unit 33 after the processing procedure is carried out. Further, the performance observation unit 33 and the processing control unit 21 may operate asynchronously by exchanging these information via a file system. With the above, the performance observation unit 33 ends the performance observation processing.

Figure 9:
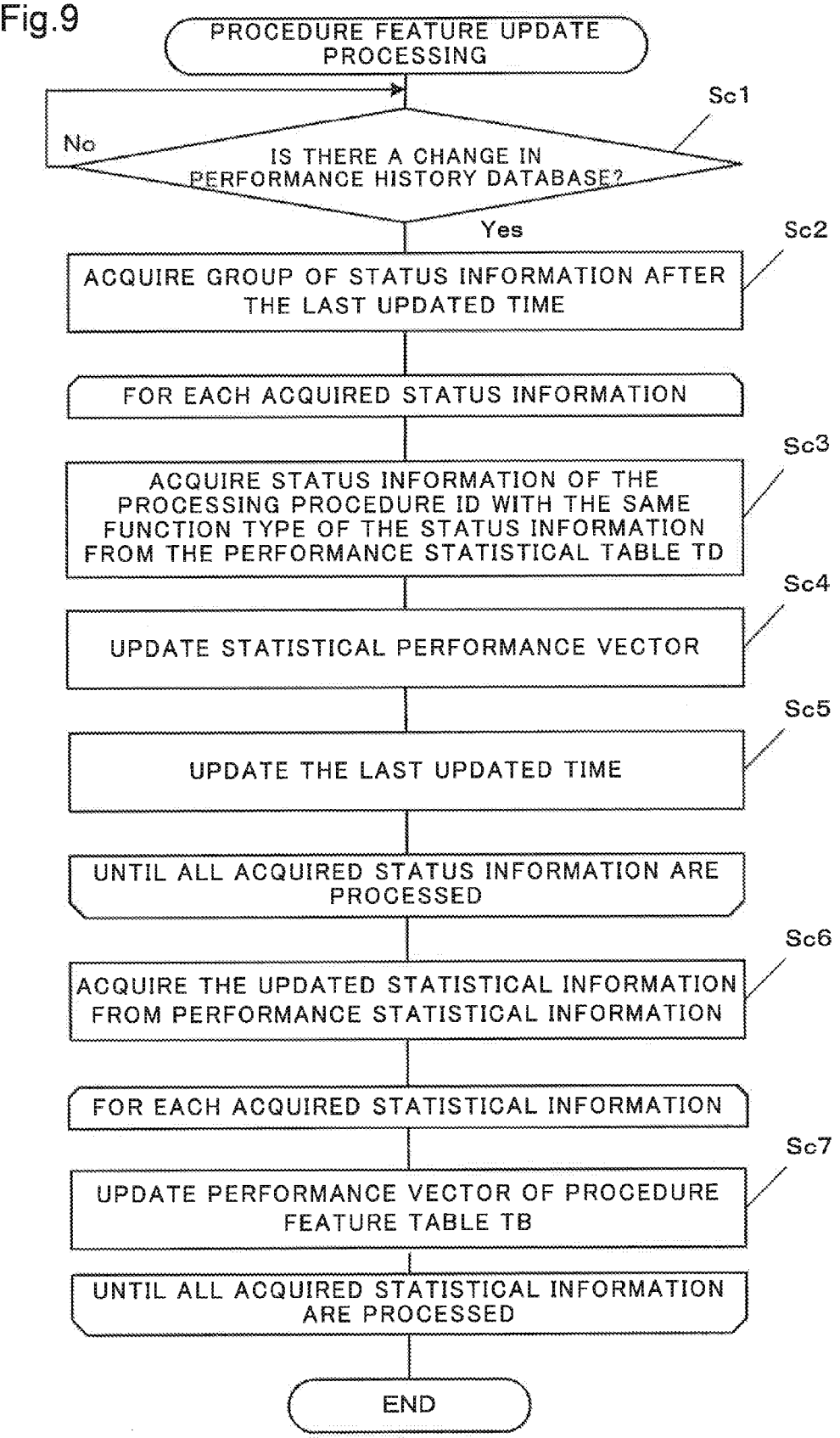
FIG. 9 It is a flowchart illustrating procedure feature updating operation of the processing procedure management system as the first exemplary embodiment of the present invention.

Next, a procedure feature update processing will be described using FIG. 9. The processing is composed of an update processing of the performance statistical table TD (step Sc2-Sc5) and update processing of the procedure feature table TB (Sc6-Sc7).

Here, at first, when there is change in the performance history table TC of the performance history database 32 (Yes in step Sc1), the procedure updating unit 36 acquires a status information a group of status information after the time when the procedure feature update processing was carried out last time, from the performance history table TC (step Sc2).

Next, the procedure updating unit 36, to each status information, acquires a tuple with the same function type and the processing procedure ID from the performance statistical table TB of the performance history database 32 (step Sc3).

Next, the procedure updating unit 36 performs statistical processing of the observation performance vector included in the tuple with the same function type and the processing procedure ID among the group of acquired status information at step Sc2 and the statistical performance vector of the tuple acquired at step Sc3, and updates the value of the statistical performance vector (step Sc4).

For example, the procedure updating unit 36, by having weighted addition of the observation performance vector value of the status information and the statistical performance vector value in consideration of the time, the procedure updating unit 36 may update the statistical performance vector value. At that time, by having the weight of the statistical performance vector value set in advance in order to be less than the weight of the observation performance vector value, the procedure updating unit 36 can suppress the influence of the observation performance vector in the past, and can calculate the statistical performance vector suppressing the influence of distribution of the observation performance vector.

In the process of step Sc4 hereof, the procedure updating unit 36 may omit processing related to a processing procedure with a obvious low possibility of being used such as a tuple of the performance statistical table TB corresponding to in which the performance vector is lower than others among a processing procedure registered at the procedure database 31. Next, the procedure updating unit 36 updates the last updated time of the tuple updated in step Sc4 to the current time (step Sc5).

The procedure updating unit 36 repeats steps Sc3-Sc5 until all status information acquired in step Sc2 is processed.

Next, the procedure updating unit 36 acquires a group of updated tuple from the performance statistical table TD of the performance history database 32 (step Sc6).

Next, the procedure updating unit 36 updates the performance vector value of a tuple corresponding to the procedure feature table TB by using the updated statistical performance vector value of the performance statistical table TD (step Sc7).

The procedure updating unit 36 repeats step Sc7 to each tuple acquired in step Sc6 and ends the procedure feature update processing.

Figure 10:
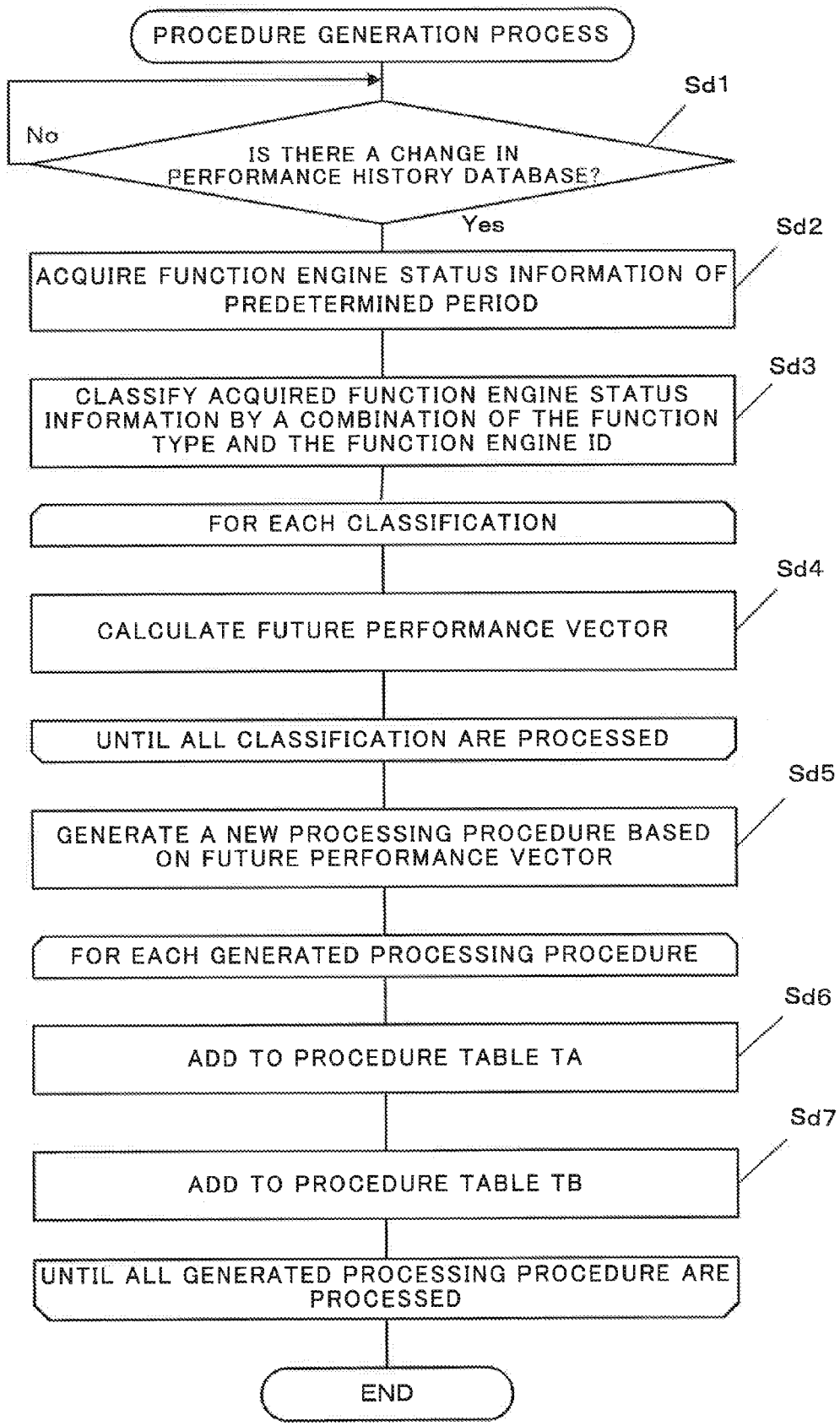
FIG. 10 It is a flowchart illustrating procedure generation operation of the processing procedure management system as the first exemplary embodiment of the present invention.

Next, a procedure generation process will be described using FIG. 10.

The processing hereof is composed of a process to calculate the future performance vector (step Sd2-Sd4) and a process to generate a new processing procedure (step Sd5-Sd7).

Here, at first, when there is change in the performance statistical table TD of the performance history database 32 (Yes in step Sd1), the future performance calculation unit 34 will acquire a group of function engine status information in the most recent period from the function engine performance history table TF (step Sd2).

Next, the future performance calculation unit 34 will classify the acquired group of function engine status information by a combination of the function type and the function engine ID (step Sd3).

Next, the future performance calculation unit 34 will add together the function engine observation performance vector of the function engine status information for each combination of the function type and the function engine ID and calculate the future performance vector (step Sd4).

The future performance calculation unit 34 will repeat step Sd4 on all combinations classified in step Sd3.

Next, the procedure generation unit 35 reconstructs the function engine based on the calculated future performance vector and generates a new processing procedure (step Sd5). Then, the procedure generation unit 35 calculates a performance vector of a new processing procedure.

Next, the procedure updating unit 36 additionally registers a newly generated processing procedure to the procedure table TA of a procedure database 31 (step Sd6).

Next, the procedure updating unit 36 additionally registers the performance vector of the additionally registered processing procedure to the procedure feature table TB of the procedure database 31 (step Sd7). The procedure updating unit 36 repeats Sd6-Sd7 to all processing procedures generated in step Sd5 and ends procedure generation process.

Next, the effect of the first exemplary embodiment of the present invention is described.

A processing procedure management system as the first exemplary embodiment of the present invention can determine a processing procedure by adapting to a performance change in a function engine used for information processing at a high speed.

This is because the processing procedure management system calculates a future performance vector for each function engine based on a performance history database, and reconstructs the function engine based on the calculated future performance vector and newly generates a new processing procedure. As a result, the processing procedure management system, as a processing procedure for carrying out information processing which realizes the function that can be requested, can predict the performance change of the function engine and newly generate a processing procedure with a high possibility of being used in the future, and because the procedure database is being expanded beforehand.

Further, the processing procedure management system as the first exemplary embodiment of the present invention can reduce a performance decline of a processing execution device.

This is because the influence of the processing by the processing procedure management device on the processing of the processing execution device is only the process to acquire the status information and the function engine status information, and processing of the history acquisition hereof needs only a minimal computing resource such as a log output. This is because the processing procedure management device can independently carry out each of the processing procedure request solving process, the performance observation processing, the procedure feature update processing, and the procedure generation process. Further, the procedure feature update processing and the procedure generation process can be carried out on a different server from the processing procedure request solving process, and can avoid competition of computing resources. As seen from the above, the processing procedure management system can reduce a performance decline of the processing execution device.

Further, the processing procedure management system as the first exemplary embodiment of the present invention can have the contents of the procedure database to be learned.

The reason for this is because the procedure updating unit 36 generates a processing procedure in consideration of the future performance vector of each function engine and registers to the procedure database, and keep updating feature information after the registration.

A Second Exemplary Embodiment

Next, a exemplary second embodiment of the present invention will be described in detail with reference to the drawings.

Figure 11:
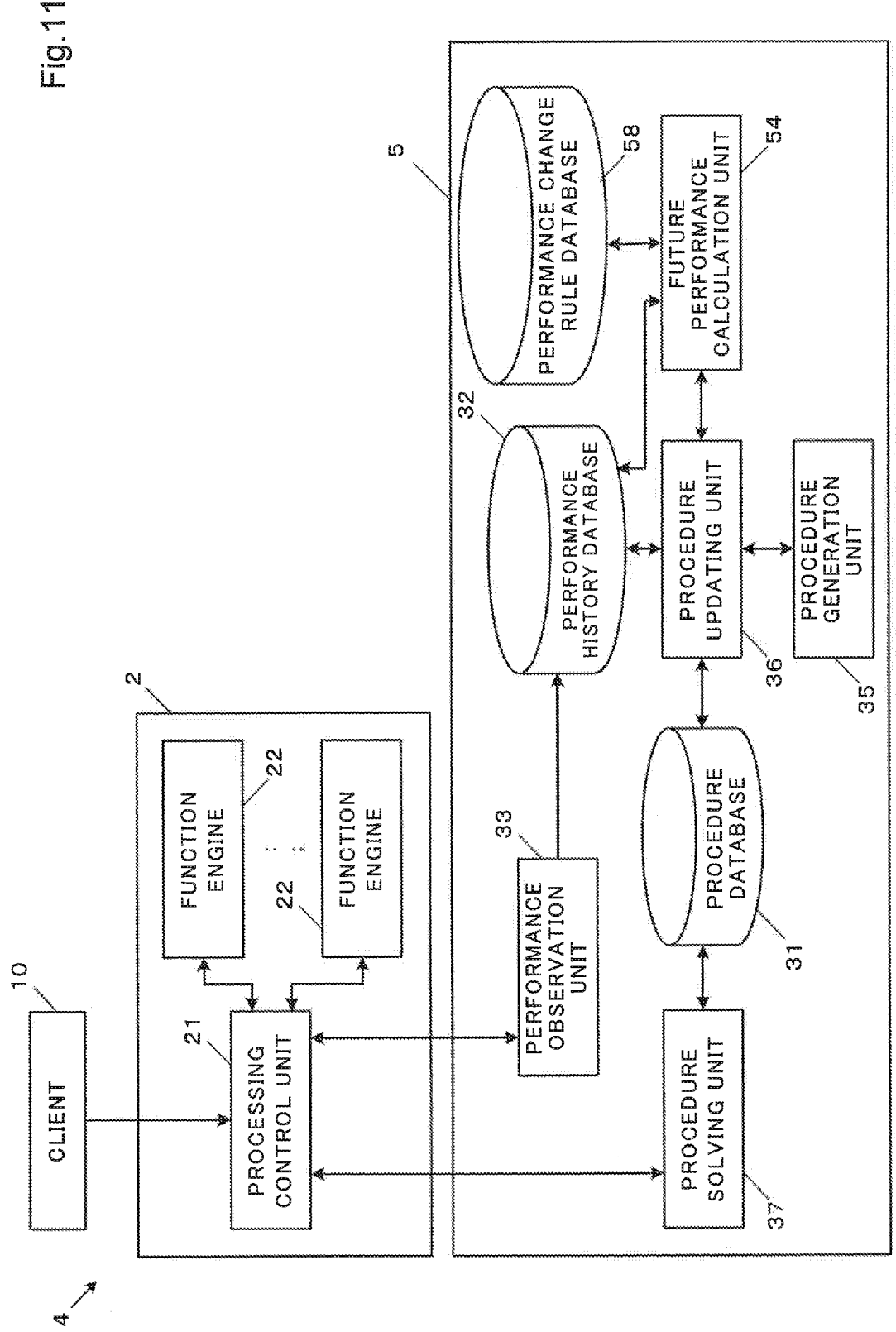
FIG. 11 It is a functional block diagram showing a composition of a processing procedure management system as a second exemplary embodiment of the present invention.

The function block of a processing procedure management system 4 as the second exemplary embodiment of the present invention is shown in FIG. 11. Further, in FIG. 11, like numerals are given to like compositions with the first exemplary embodiment of the present invention and a detailed description is omitted.

The processing procedure management system 4, to the processing procedure management system 1 as the first exemplary embodiment of the present invention, it is different in a point including a processing procedure management device 5 instead of the processing procedure management device 3. Further, the processing procedure management device 5, among like configurations with the processing procedure management device 3, includes a future performance calculation unit 54 instead of the future performance calculation unit 34, and further includes a performance change rule databases 58.

Here, the performance change rule database 58 is composed of a storage device of a computer.

The performance change rule database 58 is equipped with a performance change rule table TE. An example of data stored in the performance change rule table TE is shown in FIG. 12.

The performance change rule table TE stores a performance change rule that is composed of a function engine ID, a function type, an adaptation condition, and a performance change tendency.

The function engine ID, the function type, and the adaptation condition are the primary keys on the performance change rule table.

The function engine ID is the ID that indicates the function engine as a target of the rule.

The function type is a foreign key of the function type of the procedure feature table TB. The function type hereof indicates the premised function type when the adaptation condition is adapted.

The adaptation condition indicates the condition that the performance change rule is adapted. In an example of FIG. 12, the condition on the numerical value of a function engine observation performance vector is described using equality and inequality signs. It is desirable that the adaptation condition hereof is a notation which can be interpreted by a program. Further, the adaptation condition, for example, may be a condition related to besides the performance vector value such as the elapsed time from the function engine registration.

The performance change tendency is, when matched with the adaptation condition, a vector indicating how the processing performance of the function specified by the function engine ID and the function type will change in future. In the example of FIG. 12, the performance change tendency represents the change tendency of four indexes of a precision change tendency, a coverage factor change tendency, a relevance ratio change tendency, and a processing time change tendency. Further, the performance change tendency is described as the matrix of the differential function of the aging of the performance having a variable of time as t. Here, the performance change tendency is not necessary to take the form of the matrix of the differential function necessarily, and for example, it may be of the two values indicating the increase-decrease direction or of the numerical values representing the increase-decrease ratio.

The future performance calculation unit 54 classifies the function engine status information on the function engine performance history table TF by a combination of the function engine and the function type, adds together the latest predetermined number in each group, and calculates a current performance vector which represents the performance in a point of time in the present. Then, the future performance calculation unit 54 checks of which among the adaptation condition of the performance change rule stored in the performance change rule database 58 matches with the current performance vector.

Then, the future performance calculation unit 54, when there is a matched performance change rule which agreed, calculates a future performance vector from the current performance vector according to the rule.

For example, the future performance calculation unit 54, in the example of FIG. 12, calculates a future performance vector by applying a function described in the performance change tendency stored in the performance change rule database 58 to the current performance vector.

The operation of a processing procedure management system 4 constituted as the above will be described.

Although the processing procedure management system 4, like the first exemplary embodiment of the present invention, independently carries out a processing procedure request solving processing, a performance observation processing, a procedure feature update processing, and a procedure generation process, the operation in the procedure generation process differs.

The procedure generation process of the processing procedure management system 4 will be described using FIG. 13. In addition, in FIG. 13, like numerals are given to a step performing like process with the operation of the first exemplary embodiment of the present invention and a detailed description is omitted.

At first, when there is a change in the function engine performance history table TF (Yes in step Sd1), the future performance calculation unit 54 acquires a group of function engine status information in the most recent fixed period from the table TF hereof (step Sd2).

Next, the future performance calculation unit 54 classifies the acquired group of function engine status information by a combination of the function type and the function engine (step Sd3).

Next, the future performance calculation unit 54 adds together the function engine observation performance vector for each classification and stores the one which is added together as a group of current performance vector (step Se1).

Next, the future performance calculation unit 54 acquires a performance change rule of the matching adaptation condition from the performance change rule database 58 to each current performance vector (step Se2).

Next, the future performance calculation unit 54, by using the acquired performance change rule, calculates and stores the future performance vector from the current performance vector (step Se3).

The future performance calculation unit 54 will repeat steps Se1-Se3 to all of the combinations classified at step Sd3.

The processing procedure management system 4 operates similarly as the first exemplary embodiment of the present invention up to steps Sd5-Sd7 and generates a new processing procedure based on the future performance vector, and ends the procedure generation operation.

Next, the effect of the second embodiment of the present invention is described.

A processing procedure management system as the second exemplary embodiment of the present invention can calculate the future performance of the function engine with higher accuracy, and can have a higher possibility that a processing procedure to be newly generated will be used in the future.

The reason is because the performance change rule database 58 stores the performance change rule of the function engine in advance, and calculates the performance in the future by adapting the performance change rule of the condition that matches with the observed performance of the function engine.

A Third Exemplary Embodiment

Next, a third exemplary embodiment of the present invention will be described in detail with reference to the drawings.

Figure 14:
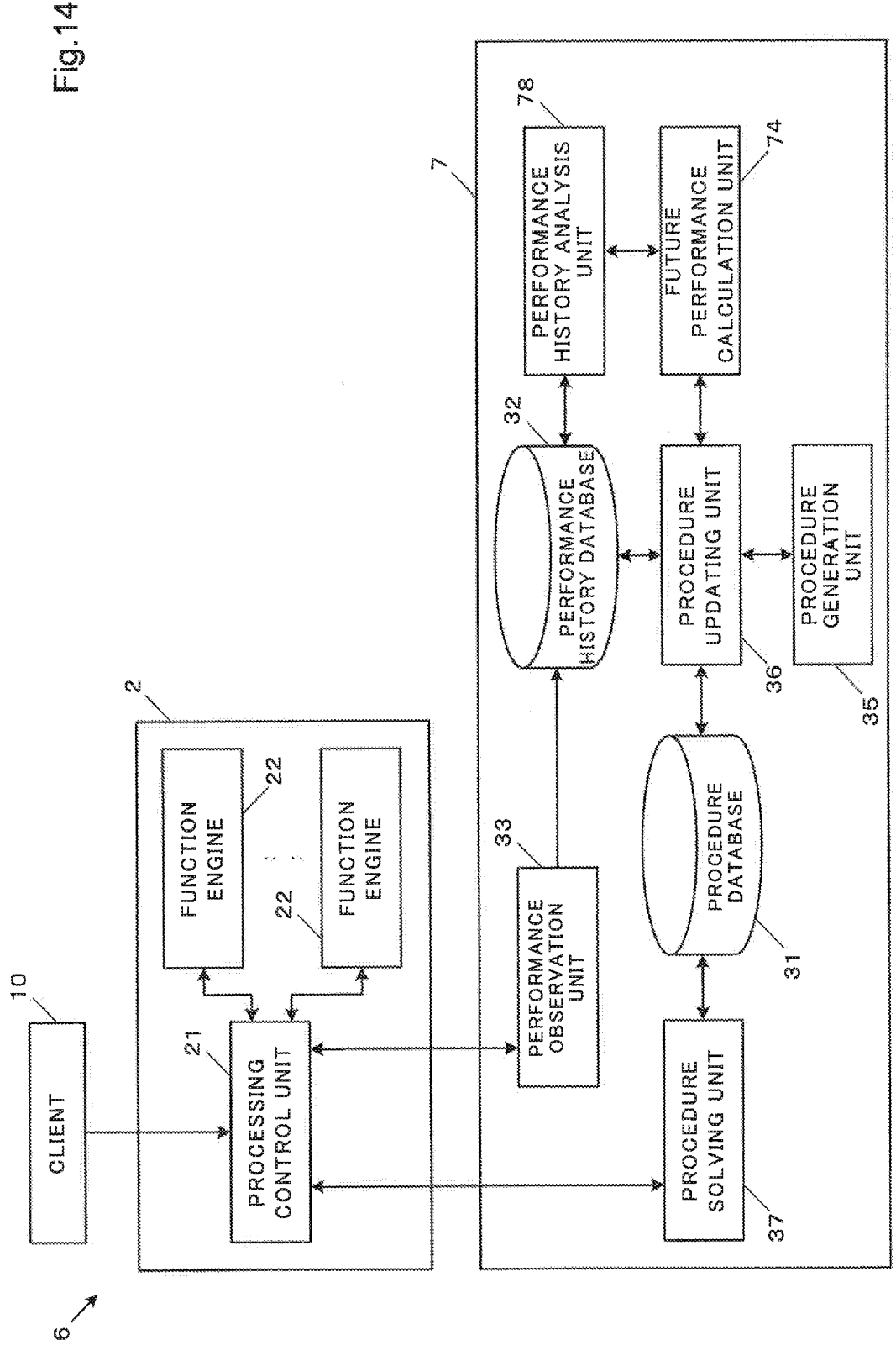
FIG. 14 It is a functional block diagram showing a composition of a processing procedure management system as a third exemplary embodiment of the present invention.

The function block of a processing procedure management system 6 as the third exemplary embodiment of the present invention is shown in FIG. 14. Further, in FIG. 14, like numerals are given to like compositions with the first exemplary embodiment of the present invention and a detailed description will be omitted.

The processing procedure management system 6, to the processing procedure management system 1 of the first exemplary embodiment of the present invention, it is different in a point including a processing procedure management device 7. Further, the processing procedure management device 7, among like configurations of the processing procedure management device 3, includes a future performance calculation unit 74 instead of the future performance calculation unit 34, and further includes a performance history analysis unit 78.

The performance history analysis unit 78 analyzes time series of the function engine observation performance vector stored in the performance history database 32. Here, the performance history analysis unit 78 should use existing technology which analyzes a time-series data statistically and calculates a predicted value.

The future performance calculation unit 74, by using the performance history analysis unit 78, calculates the future performance vector of the function engine.

For example, the performance calculation unit 74 may find the change tendency of the function engine observation performance vector by the performance history analysis unit 78 and calculate the future performance vector based on the change tendency. Further, the future performance calculation unit 74 may calculate the future performance vector based on not only the change tendency but also other information analyzed by the performance history analysis unit 78.

The future performance calculation unit 74 may classify the function engine status information by a combination of the function engine and the function type, and have the future performance vector be searched for each classification.

Further, the future performance calculation unit 74 may acquire the predetermined number of function engine observation performance vector of the most recent, and search for the future performance vector by analyzing the acquired function engine observation performance vector.

The operation of the processing procedure management system 6 constituted as the above will be described.

The processing procedure management system 6, like the first exemplary embodiment of the present invention, although independently carries out a processing procedure request solving processing, a performance observation processing, a procedure feature update processing, and a procedure generation process, the operation in the procedure generation process differs.

Figure 15:
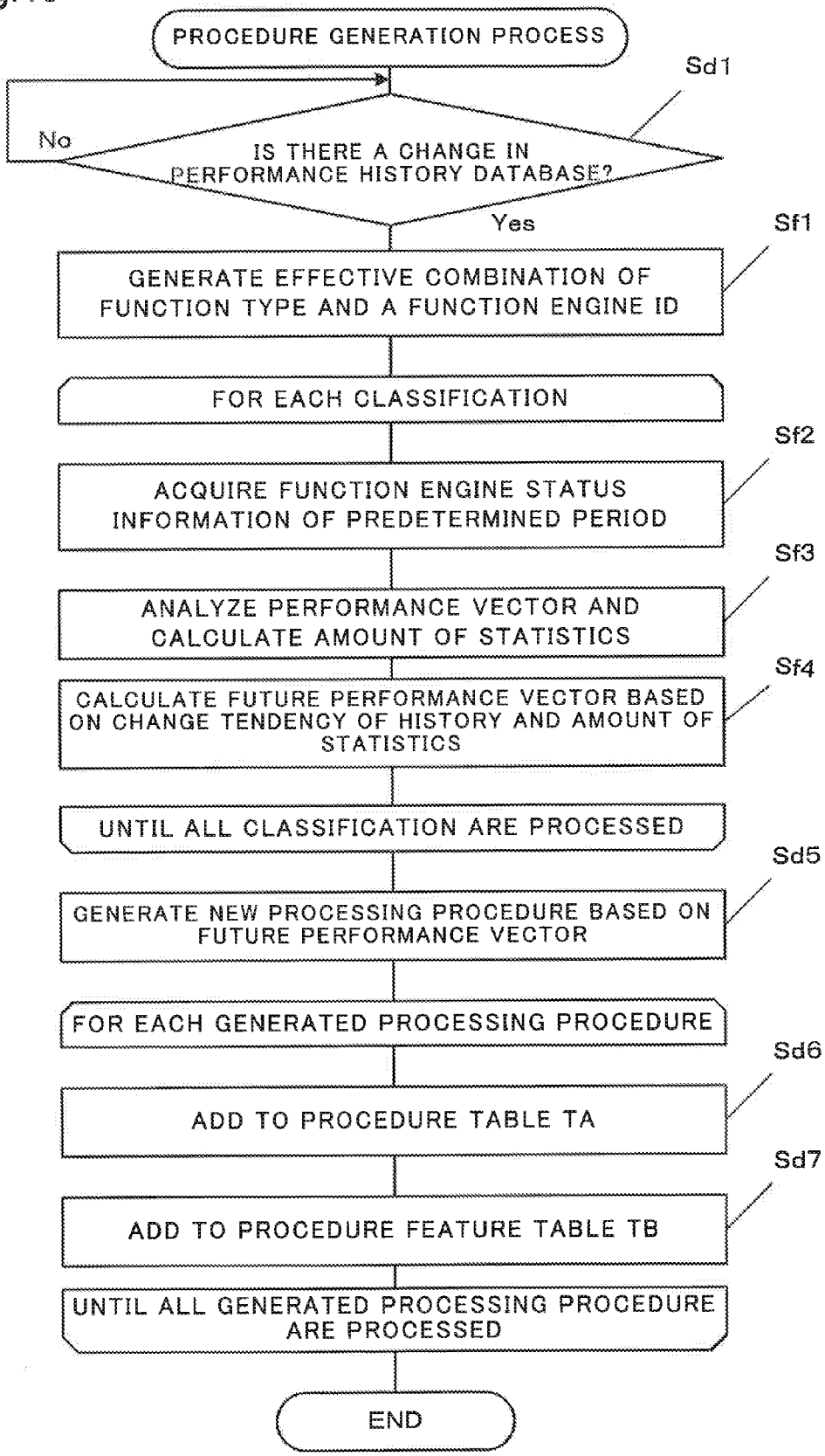
FIG. 15 It is a flowchart illustrating procedure generation operation of the processing procedure management system as the third exemplary embodiment of the present invention.

The procedure generation process of the processing procedure management system 6 will be described using FIG. 15. Further, like numerals are given to the step performing the same processing as the operation of the first exemplary embodiment of the present invention and a detailed description will be omitted.

The processing procedure generation process of the processing procedure management system 6, to the procedure generation processing of the first exemplary embodiment of the present invention, instead of the process of step Sd2-Sd4 which calculates the future performance vector, the point which carries out the process of Steps Sf1-Sf4 differs.

Here, at first, when the future performance calculation unit 74 detects change in the performance history database 32 (Yes in step Sd1), an effective combination of the function type and the function engine ID is generated (step Sf1).

Next, the future performance calculation unit 74, to each combination, from the function engine performance history table TF, acquires a fixed number of a group of function engine status information corresponding to an appropriate combination (step Sf2).

Next, the future performance calculation unit 74 performs statistical processing of the function engine observation performance vector included in each acquired function engine status information and calculate the amount of statistics (step Sf3).

Next, the future performance calculation unit 74, by using the performance history analysis unit 78, from the function engine observation performance vector, presumes the tendency of the performance change of the function engine in the function type (Sf4).

The future performance calculation unit 74 repeats the processing of Sf4 from Sf2 to all combinations generated in step Sf1.

Next, the procedure generation unit 35 generates a processing procedure based on the future performance vector (step Sd5), and a procedure updating unit 36 updates a procedure database 31 (step Sd6-Sd7) and ends procedure generation process.

Next, the effect of the third exemplary embodiment of the present invention is described.

A processing procedure management system as the third exemplary embodiment of the present invention can calculate the future performance of the function engine with higher accuracy, and can have a higher possibility that a processing procedure to be newly generated will be used in the future.

The reason is because the future performance calculation unit 74 analyzes the observed performance of the function engine and presumes the change tendency, and predicts the performance in the future by using the presumed change tendency.

A Fourth Exemplary Embodiment

Next, a fourth exemplary embodiment of the present invention will be described in detail with reference to the drawings.

Figure 16:
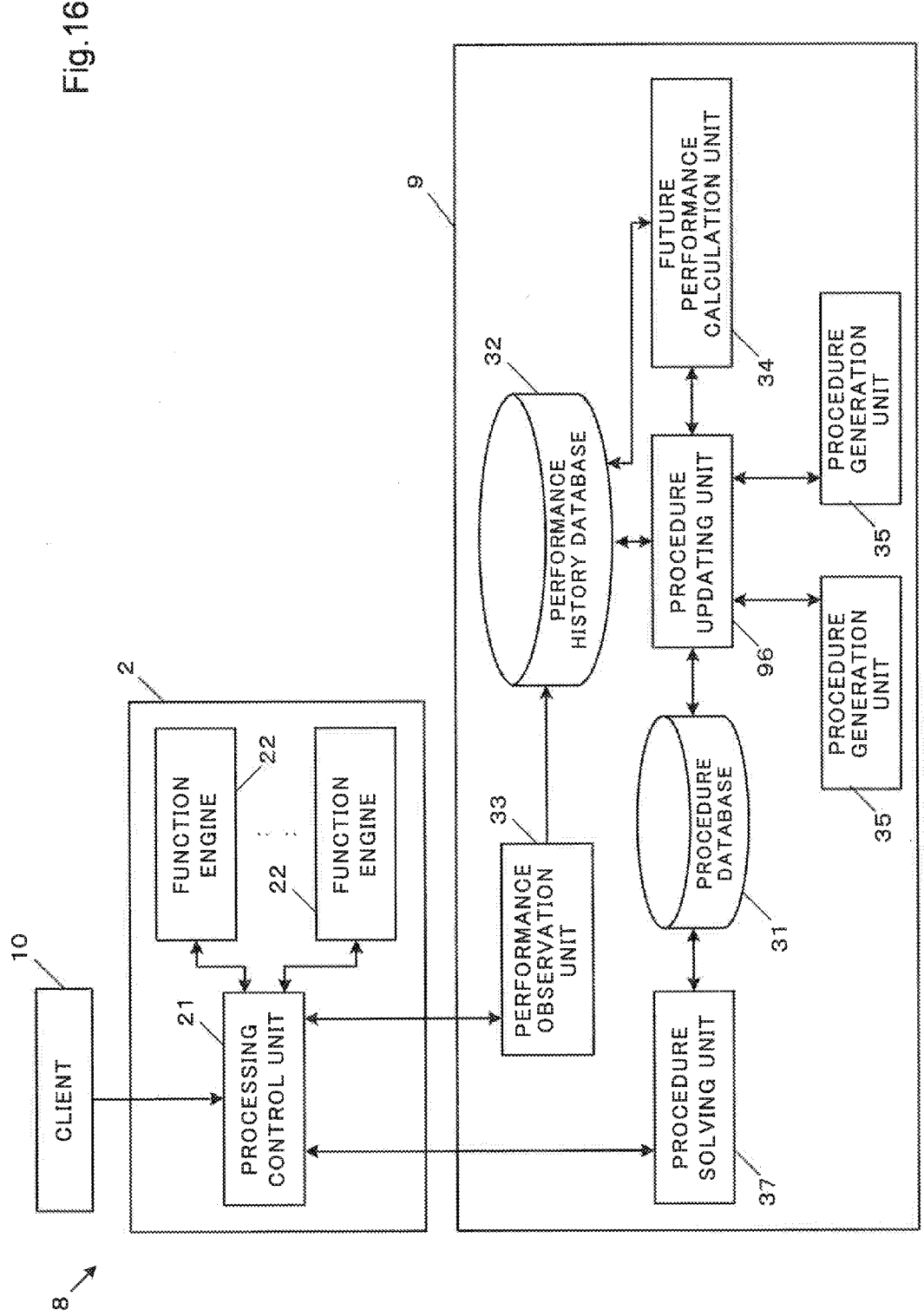
FIG. 16 It is a functional block diagram showing a composition of a processing procedure management system as a fourth exemplary embodiment of the present invention.

The function block of a processing procedure management system 8 as the fourth exemplary embodiment of the present invention is shown in FIG. 16. Further, in FIG. 16, like numerals are given to like compositions with the first exemplary embodiment of the present invention and a detailed description is omitted.

The processing procedure management system 8, to the processing procedure management system 1 of the first exemplary embodiment of the present invention, a point including a processing procedure management device 9 instead of the processing procedure management device 3 is different. The processing procedure management device 9, among the same configuration with the processing procedure management device 3, includes a procedure updating unit 96 and further includes a plurality of procedure generation unit 35. Further, in FIG. 16, although two procedure generation units 35 are shown, the number of the procedure generation unit 35 provided in the processing procedure management device 9 is not limited by the present invention.

The procedure generation unit 35, as explained in the first exemplary embodiment of the present invention, reconstructs the function engine based on the future performance vector of each function engine and generates a new processing procedure for having the processing execution device 2 to realize the function that can be requested from the client device 10.

Further, a plurality of procedure generation units 35 may use different one respectively as algorithm which generates a new processing procedure. Further, it is desirable that the input/output format to the procedure updating unit 96 of each procedure generation unit 35 is unified.

The procedure updating unit 96 outputs the future performance vector which was calculated by the future performance calculation unit 34 to a plurality of procedure generation units 35 and performs additional registration of a processing procedure which was selected from a processing procedure received from the procedure generation unit 35 respectively to a procedure database.

At that time, the procedure updating unit 96, as a processing procedure for additional registration, may select one in which the performance vector value among the processing procedure received from the procedure generation unit 35 exceeds the predetermined value. Or more specifically, the procedure updating unit 96, may select a processing procedure of predetermined number sequentially from the one with excellent performance vector value, or may be selected by other judgment conditions.

The operation of the processing procedure management system 8 constituted as the above will be described.

Although the processing procedure management system 8, like the first exemplary embodiment of the present invention, independently carries out a processing procedure request solving process, a performance observation processing, a procedure feature update processing, and a procedure generation process, the operation in the processing procedure management system 8 is different.

Figure 17:
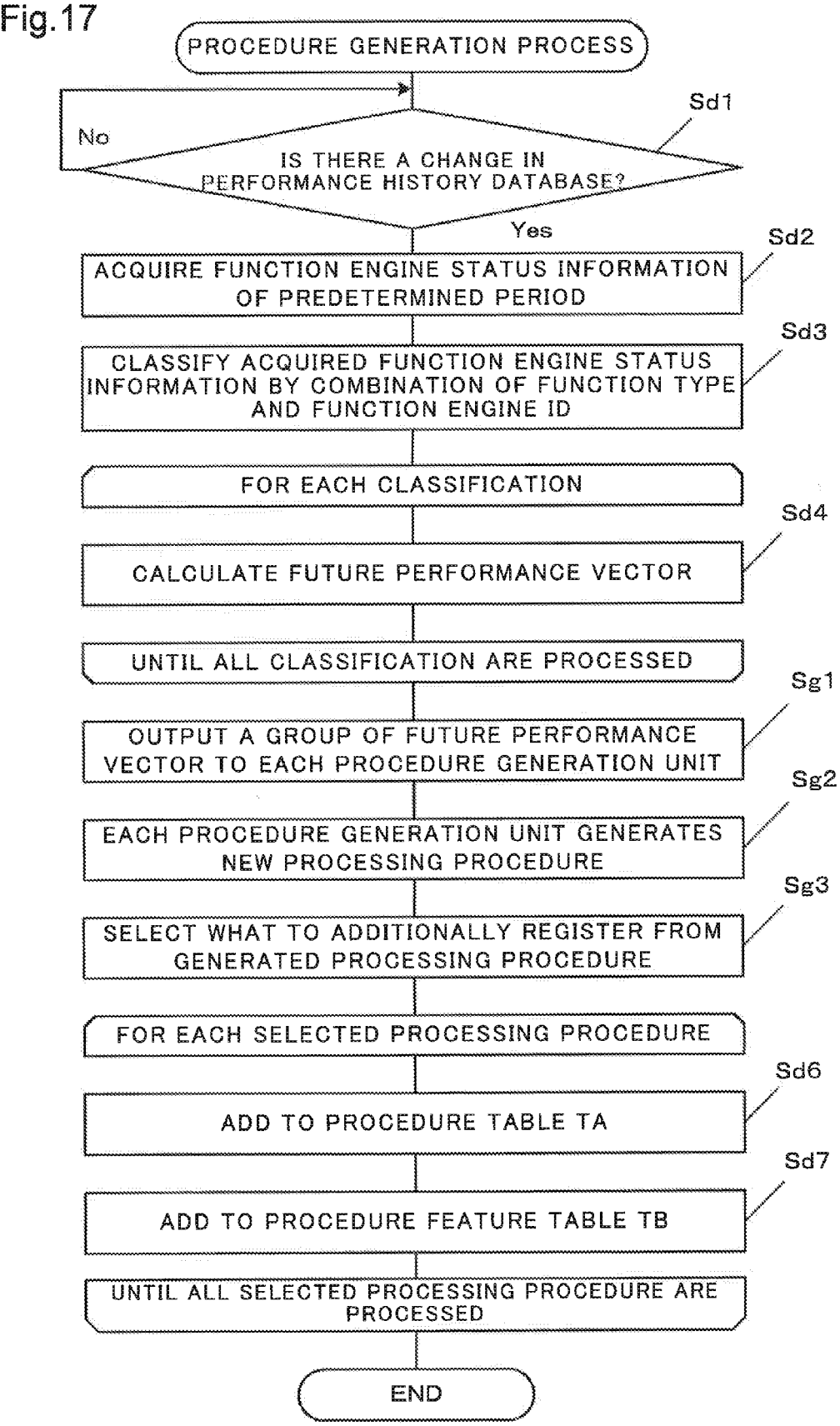
FIG. 17 It is a flowchart illustrating procedure generation operation of the processing procedure management system as the fourth exemplary embodiment of the present invention.
Figure 18:
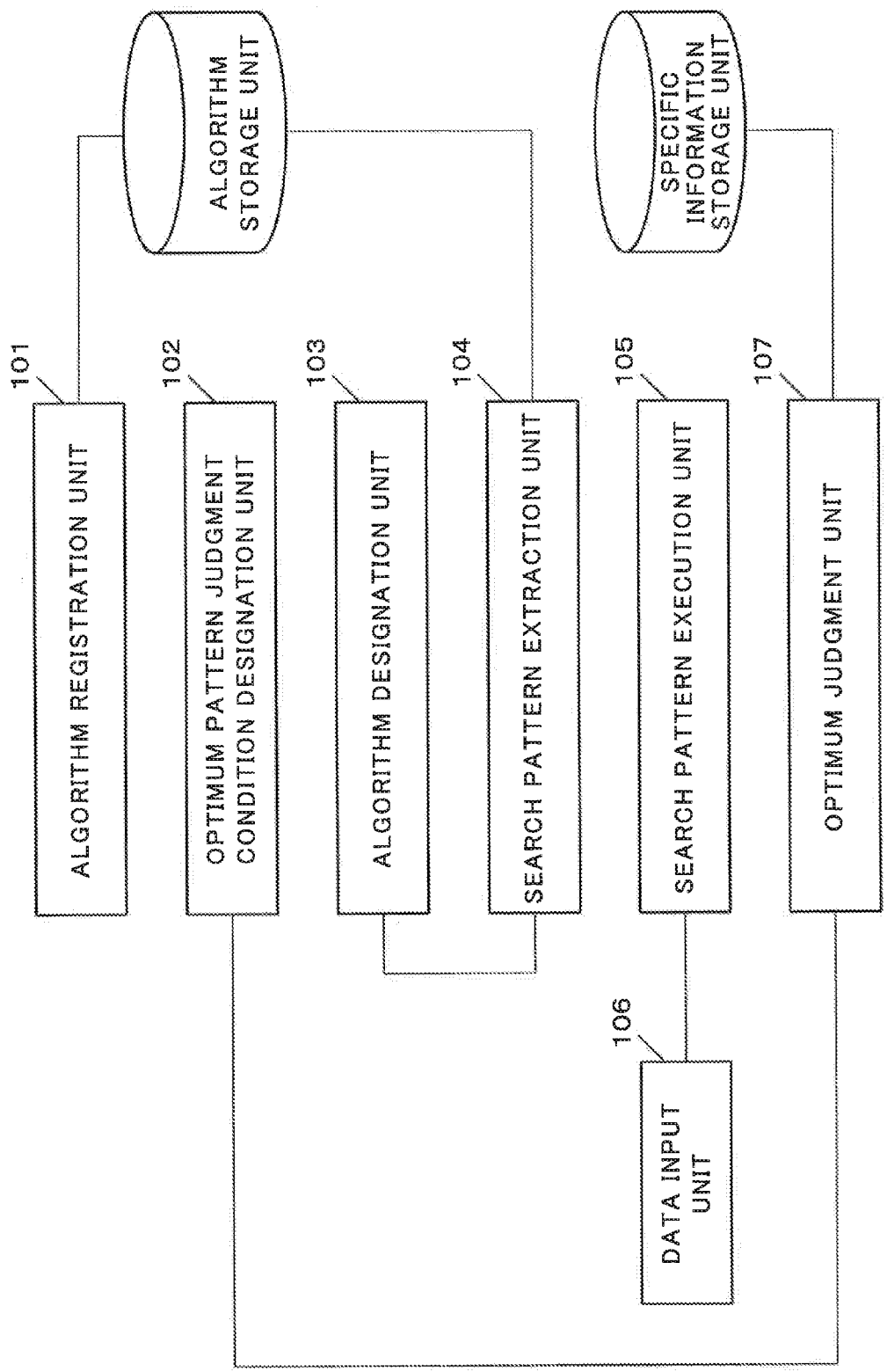
FIG. 18 It is a functional block diagram showing a composition of a processing procedure management device of pertinent art.

The procedure generation process of the processing procedure management system 8 will be described using FIG. 17. Further, like numerals are given to like compositions with the operation of the first exemplary embodiment of the present invention and a detailed description is omitted.

The procedure generation process of the processing procedure management system 8, to the procedure generation process of the first exemplary embodiment of the present invention, instead of the process of step Sd5 which newly generates a processing procedure, a point that carries out the processing of steps Sg1-Sg3 differs.

Here, at first, up to steps Sd1-Sd4 it will be operated like the first exemplary embodiment of the present invention and calculates the future performance vector of each function engine.

Next, the procedure updating unit 96 hands the future performance vector to each procedure generation unit 35 (step Sg1).

Next, each of the procedure generation unit 35, based on the future performance vector, respectively generates a new processing procedure for having the processing execution device 2 to carry out the function that can be requested from the client device 10 (step Sg2).

Next, the procedure updating unit 96 receives a group of the generated processing procedure from each procedure generation unit 35 respectively and selects a processing procedure which performs additional registration to the procedure database 31 (step Sg3). At that time, the procedure updating unit 96, among the processing procedure received from each of the procedure generation unit 35, when there is one in which the content overlaps with other processing procedure, then the overlapped one may be eliminated.

Next, the procedure updating unit 96 adds the selected processing procedure and the performance information to the procedure database 31 (step Sd6-Sd7) and ends the procedure generation processing.

Next, the effect of the fourth exemplary embodiment of the present invention is described.

A processing procedure management system as the fourth exemplary embodiment of the present invention, it is possible to improve the coverage factor of the processing procedure generated by adapting to the performance change of the function engine in the future.

This is because by selecting one with the excellent performance from a processing procedure which was generated by a plurality of procedure generation unit 35 based on different algorithm respectively, it is possible to have a higher possibility of the processing procedure adapting to the performance change of the function engine to be used in the future.

Further, in each exemplary embodiment of the present invention mentioned above, a program which operates a processing procedure management device composes the processing procedure management program of the present invention.

Furthermore, each embodiment mentioned above can be combined appropriately and be carried out.

Further, the present invention is not limited to each exemplary embodiment mentioned above, and it is possible to be put into effect by various embodiments.

Furthermore, although one part or all parts of the above mentioned embodiments can be described as the following additions, is not limited to the below.

(Addition 1)

A processing procedure management device comprising:

a procedure database which stores a processing procedure for carrying out information processing together with performance information representing its performance;

a performance history database which stores an observation performance information representing the performance that is observed when said information processing is carried out according to said processing procedure and a function engine observation performance information representing the performance that is observed for each function engine which carries out a processing module that constitutes said processing procedure;

a performance observation means which acquires said observation performance information and said function engine observation performance information and stores to said performance history database;

a future performance calculation means which calculates future performance information representing the performance at some point in the future for each function engine based on the said performance history database;

a procedure generation means which generates a new processing procedure for reconstructing said processing module based on said future performance information and carrying out said information processing;

a procedure updating means which updates the performance information of said procedure database based on said performance history database together with adding a processing procedure generated by said procedure generation means and its performance information to said procedure database; and a procedure solving means which determines a processing procedure for carrying out the designated information processing based on said procedure database and outputs.

(Addition 2)

The processing procedure management device according to addition 1, further comprising:

a performance change rule databases which has stored a performance change rule representing a regulation which will calculate said future performance information according to said function engine observation performance information; wherein said future performance calculation means calculates said future performance information by adapting said performance change rule which matches with said function engine observation performance information.

(Addition 3)

The processing procedure management device according to addition 1, further comprising:

a performance history analysis means which analyzes the history of said function engine observation performance information as a time series data; wherein said future performance calculation means calculates said future performance information by using said performance history analysis means.

(Addition 4)

The processing procedure management device according to addition 3; wherein
said future performance calculation means calculates said future performance information based on the change tendency of said function engine observation performance information analyzed by said performance history analysis means.

(Addition 5)

The processing procedure management device according to any one of additions 1 to 4, wherein
when including a plurality of said procedure generation means;
said procedure updating means adds a processing procedure selected from a plurality of processing procedure generated respectively at said plurality of procedure generation means to said procedure database.

(Addition 6)

A processing procedure management system including a processing execution device which carries out information processing according to a processing procedure and a processing procedure management device which manages said processing procedure; wherein
said processing execution device includes:
a processing control means which requests a decision of a processing procedure for carrying out said information processing to said processing procedure management device together with carrying out said information processing according to a processing procedure determined by said processing procedure management device; and
a function engine which carries out each processing module that constitutes said processing procedure respectively; wherein
said processing procedure management device includes:
a procedure database which stores said processing procedure together with performance information representing its performance;
a performance history database which stores an observation performance information representing the observation when said information processing is carried out according to said processing procedure and a function engine observation performance information representing the performance that is observed for each said function engine;
a future performance calculation means which calculates future performance information representing the performance at some point in the future for each function engine based on the said performance history database;
a procedure generation means which generates a new processing procedure for reconstructing said processing module based on said future performance information and carrying out said information processing;
a procedure updating means which updates the performance information of said procedure database based on said performance history database together with adding a processing procedure generated by said procedure generation means and its performance information to said procedure database; and
a procedure solving means which determines a processing procedure for carrying out the designated information processing based on said procedure database and outputs.

(Addition 7)

The processing procedure management system according to addition 6: wherein
said processing procedure management device further comprises:
a performance change rule databases which has stored a performance change rule representing a regulation which calculates said future performance information according to said function engine observation performance information; wherein
said future performance calculation means calculates said future performance information by adapting said performance change rule which matches with said function engine observation performance information.

(Addition 8)

A processing procedure management method by using a processing execution device which carries out information processing according to a processing procedure and a processing procedure management device which manages said processing procedure: wherein
said processing procedure management device:
stores said processing procedure in a procedure database with performance information representing its performance;
acquires observation performance information representing the performance that is observed when said information processing is carried out according to said processing procedure, and function engine observation performance information representing the performance that is observed for each function engine which carries out said processing module;
stores the acquired observation performance information and the function engine observation performance information in performance history database;
calculates future performance information representing the performance at some time in the future for each said function engine based on said performance history database;
generates a new processing procedure for reconstructing said processing module based on said future performance information and for carrying out said information processing;
updates performance information on said procedure database based on said performance history database;
adds said processing procedure that is newly generated and its performance information to said procedure database; wherein
said processing execution device:
requests a decision of a processing procedure for carrying out said information processing to said processing procedure management device; wherein
said processing procedure management device:
determines a processing procedure for carrying out the requested information processing from said procedure database; and
said processing execution device:
executes said information processing according to a processing procedure determined by said processing procedure management device.

(Addition 9)

The processing procedure management method according to addition 8: wherein
said processing procedure management device:
stores a performance change rule representing a regulation which calculates said future performance information according to said function engine observation performance information in a performance change rule database; and
calculates said future performance information by adapting said performance change rule which matches with said function engine observation performance information when calculating said future performance information.

(Addition 10)

A recording medium storing a processing procedure management program to make a processing procedure management device which manages a processing procedure for executing information processing to carry out:

a processing procedure storage step for storing said processing procedure in a procedure database with performance information representing its performance;

a performance observation step for acquiring observation performance information representing the performance that is observed when said information processing is carried out according to said processing procedure and function engine observation performance information representing the performance that is observed for each function engine which carries out a processing module that constitutes processing procedure;

a performance history storage step for storing observation performance information and function engine observation performance information acquired in said performance observation step to performance history database;

a future performance calculation step for calculating the future performance information representing the performance at some point in the future for each said function engine based on said performance history database;

a procedure generation step for generating a new processing procedure for reconstructing said processing module based on said future performance information and carrying out said information processing;

a procedure updating step for updating performance information of said procedure database based on said performance history database together with adding a processing procedure generated in said procedure generation step and its performance information to said procedure database; and a procedure solving step for determining a processing procedure for carrying out designated information processing based on said procedure database and outputs.

(Addition 11)

The recording medium according to addition 10 which have said processing procedure management device to further carry out:

a performance change rule storage step for having said a performance change rule representing a regulation of calculating said future performance information according to said function engine observation performance information stored in a performance change rule database;

a step for calculating said future performance information by adapting said performance change rule which matches said function engine observation performance observation at said future performance calculation step.

(Addition 12)

A data structure comprising:

processing procedure information representing the combination and the execution sequence of a processing module that constitutes a processing procedure;

performance information representing a performance of said processing procedure;

observation performance information representing a performance which is observed when said processing procedure is executed;

function engine observation performance information representing a performance which is observed at each function engine carrying out a processing module that constitutes said processing procedure when said processing procedure is carried out; and statistical performance information which is calculated for each said processing procedure based on said observation performance information.

Although the present invention has been described with reference to the embodiments above, the present invention is not limited to the above mentioned embodiments. Various modifications which a person skilled in the art can understand in the scope of the present invention can be performed in the composition and details of the present invention.

This application claims the benefit of Japanese application Japanese Patent Application No. 2010-095832 filed on Apr. 19, 2010 the contents of which are incorporated by reference herein in their entirety.

THE INDUSTRIAL APPLICABILITY

The present invention provides a processing procedure management device which can determines a processing procedure by adapting to a performance change of a function engine used for information processing at a high speed. The present invention is suitable as a device which determines a processing procedure from a processing procedure which becomes a candidate in a processing foundation which operates by integrating a plurality of function engine.

A DESCRIPTION OF THE NUMERALS 1, 4, 6, 8 processing procedure management system
2 Processing execution device
3, 5, 7, 9 processing procedure management device
10 client device
11 CPU
12 RAM
13 ROM
14 storage device
21 processing control unit
22 function engine
31 Procedure database
32 performance history database
33 performance observations unit
34, 54, 74 future performance calculation unit
35 procedure generation unit
36, 96 procedure updating unit
37 procedure solving unit
58 performance change rule database
78 performance history analysis unit

The invention claimed is:

1. A processing procedure management device comprising:

a procedure database which stores a processing procedure for carrying out information processing together with performance information representing performance of said procedure database;

a performance history database which stores an observation performance information representing the performance of said procedure database that is observed when said information processing is carried out according to said processing procedure and a function engine observation performance information representing performance that is observed for each function engine which carries out a processing module that constitutes said processing procedure;

performance observation unit which acquires said observation performance information and said function engine observation performance information and stores to said performance history database;

future performance calculation unit which calculates future performance information representing the performance at some point in the future for each function engine based on the said performance history database;

procedure generation unit which generates a new processing procedure for reconstructing said processing module based on said future performance information and carrying out said information processing;

procedure updating unit which updates the performance information of said procedure database based on said performance history database together with adding a processing procedure generated by said procedure generation unit and said performance information of said procedure database; and procedure solving unit which determines a processing procedure for carrying out the designated information processing based on said procedure database and outputs said processing procedure, wherein said future performance calculation unit calculates said future performance information based on a change tendency of said function engine observation performance information, and wherein said change tendency is a vector indicating how the processing performance of a function specified by a function engine ID and a function type will change in the future.

2. The processing procedure management device according to claim 1, further comprising:

a performance change rule databases which has stored a performance change rule representing a regulation which will calculate said future performance information according to said function engine observation performance information;

wherein said future performance calculation unit calculates said future performance information by adapting said performance change rule which matches with said function engine observation performance information.

3. The processing procedure management device according to claim 1, further comprising:

performance history analysis unit which analyzes the history of said function engine observation performance information as a time series data;

wherein said future performance calculation unit calculates said future performance information by using said performance history analysis unit.

4. The processing procedure management device according to claim 3, wherein said function engine observation performance information is analyzed by said performance history analysis unit.

5. The processing procedure management device according to claim 1, wherein when including a plurality of said procedure generation units;

said procedure updating means unit adds a processing procedure selected from a plurality of processing procedure generated respectively at said plurality of procedure generation units to said procedure database.

6. A processing procedure management system including a processing execution device which carries out information processing according to a processing procedure and a processing procedure management device which manages said processing procedure; wherein said processing execution device includes:

a processing control unit which requests a decision of a processing procedure for carrying out said information processing to said processing procedure management device together with carrying out said information processing according to a processing procedure determined by said processing procedure management device; and a function engine which carries out each processing module that constitutes said processing procedure respectively;

wherein said processing procedure management device includes:

a procedure database which stores said processing procedure together with performance information representing performance of said procedure database;

a performance history database which stores an observation performance information representing the observation when said information processing is carried out according to said processing procedure and a function engine observation performance information representing the performance that is observed for each said function engine;

a future performance calculation unit which calculates future performance information representing the performance at some point in the future for each said function engine based on the said performance history database;

a procedure generation unit which generates a new processing procedure for reconstructing said processing module based on said future performance information and carrying out said information processing;

a procedure updating unit which updates the performance information of said procedure database based on said performance history database together with adding a processing procedure generated by said procedure generation unit and performance information of said procedure database; and a procedure solving unit which determines a processing procedure for carrying out the designated information processing based on said procedure database and outputs the processing procedure, wherein said future performance calculation unit calculates said future performance information based on a change tendency of said function engine observation performance information, and wherein said change tendency is a vector indicating how processing performance of a function specified by a function engine ID and a function type will change in the future.

7. The processing procedure management system according to claim 6, wherein said processing procedure management device further comprises:

a performance change rule databases which has stored a performance change rule representing a regulation which calculates said future performance information according to said function engine observation performance information; wherein said future performance calculation unit calculates said future performance information by adapting said performance change rule which matches with said function engine observation performance information.

8. A processing procedure management method by using a processing execution device which carries out information processing according to a processing procedure and a processing procedure management device which manages said processing procedure: wherein said processing procedure management device:

stores said processing procedure in a procedure database with performance information representing performance of said procedure database;

acquires observation performance information representing the performance that is observed when said information processing is carried out according to said processing procedure, and function engine observation performance information representing the performance that is observed for each function engine which carries out said processing module;

stores the acquired observation performance information and the function engine observation performance information in performance history database;

calculates future performance information representing the performance at some time in the future for each said function engine based on said performance history database;

generates a new processing procedure for reconstructing said processing module based on said future performance information and for carrying out said information processing;

updates performance information on said procedure database based on said performance history database;

adds said processing procedure that is newly generated and said performance information of said procedure database, wherein said future performance information is calculated based on a change tendency of said function engine observation performance information, and wherein said change tendency is a vector indicating how processing performance of a function specified by a function engine ID and a function type will change in the future;

wherein said processing execution device: requests a decision of a processing procedure for carrying out said information processing to said processing procedure management device;

wherein said processing procedure management device:

determines a processing procedure for carrying out the requested information processing from said procedure database; and said processing execution device:

executes said information processing according to a processing procedure determined by said processing procedure management device.

9. The processing procedure management method according to claim 8, wherein said processing procedure management device:

stores a performance change rule representing a regulation which calculates said future performance information according to said function engine observation performance information in a performance change rule database; and calculates said future performance information by adapting said performance change rule which matches with said function engine observation performance information when calculating said future performance information.

10. A non-transitory recording medium storing a processing procedure management program to make a processing procedure management device which manages a processing procedure for executing information processing to carry out:

a processing procedure storage step for storing said processing procedure in a procedure database with performance information representing performance of said procedure database;

a performance observation step for acquiring observation performance information representing the performance that is observed when said information processing is carried out according to said processing procedure and function engine observation performance information representing the performance that is observed for each function engine which carries out a processing module that constitutes processing procedure;

a performance history storage step for storing observation performance information and function engine observation performance information acquired in said performance observation step to performance history database;

a future performance calculation step for calculating the future performance information representing the performance at some point in the future for each said function engine based on said performance history database;

a procedure generation step for generating a new processing procedure for reconstructing said processing module based on said future performance information and carrying out said information processing;

a procedure updating step for updating performance information of said procedure database based on said performance history database together with adding a processing procedure generated in said procedure generation step and performance information of said procedure database; and a procedure solving step for determining a processing procedure for carrying out designated information processing based on said procedure database and outputs said processing procedure, wherein said future performance information is calculated based on a change tendency of said function engine observation performance information, and wherein said change tendency is a vector indicating how processing performance of a function specified by a function engine ID and a function type will change in the future.

* * * * *